US011228200B2

(12) United States Patent
Wang et al.

(10) Patent No.: US 11,228,200 B2
(45) Date of Patent: Jan. 18, 2022

(54) UAV HYBRID POWER SYSTEMS AND METHODS

(71) Applicant: SZ DJI TECHNOLOGY CO., LTD., Shenzhen (CN)

(72) Inventors: Lei Wang, Shenzhen (CN); Wentao Wang, Shenzhen (CN); Dayang Zheng, Shenzhen (CN); Juncheng Zhan, Shenzhen (CN); Yuancai Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 206 days.

(21) Appl. No.: 16/704,608

(22) Filed: Dec. 5, 2019

(65) Prior Publication Data

US 2020/0108940 A1 Apr. 9, 2020

Related U.S. Application Data

(63) Continuation of application No. 15/476,583, filed on Mar. 31, 2017, now Pat. No. 10,501,195, which is a (Continued)

(51) Int. Cl.
*B64D 27/24* (2006.01)
*B64C 39/02* (2006.01)
(Continued)

(52) U.S. Cl.
CPC .............. *H02J 7/34* (2013.01); *B64C 39/024* (2013.01); *B64D 27/24* (2013.01); *H02M 3/156* (2013.01);
(Continued)

(58) Field of Classification Search
CPC combination set(s) only.
See application file for complete search history.

(56) References Cited

U.S. PATENT DOCUMENTS

| 7,994,745 B2 | 8/2011 | Fujino et al. |
| 8,008,801 B2 | 8/2011 | Fujino et al. |

(Continued)

FOREIGN PATENT DOCUMENTS

| CN | 101267124 A | 9/2008 |
| CN | 101938162 A | 1/2011 |

(Continued)

OTHER PUBLICATIONS

EnergyOR Technologies Inc. Energyor demonstrates multirotor UAV flight of 3 hours, 43 minutes (/news/post:30). Available at http://energyor.com/news/post:30. Accessed Jul. 6, 2017.
(Continued)

*Primary Examiner* — Carlos Amaya
(74) *Attorney, Agent, or Firm* — Anova Law Group, PLLC

(57) ABSTRACT

A hybrid power system comprises a power controller adapted to be in communication with a first power source, a second power source, and a load. The power controller is configured to: control discharging of the first power source without permitting discharging of the second power source to power the load when a power drawn by the load is greater than a predetermined threshold power for a time period; and control discharging of the second power source to power the load when the power drawn by the load is greater than the predetermined threshold power starting from when the time period ends.

20 Claims, 19 Drawing Sheets

Related U.S. Application Data continuation of application No. PCT/CN2015/100211, filed on Dec. 31, 2015.

(51) Int. Cl.
  *H02M 3/156* (2006.01)
  *H02J 7/34* (2006.01)
  *B64D 41/00* (2006.01)

(52) U.S. Cl.
  CPC .. *B64C 2201/027* (2013.01); *B64C 2201/042* (2013.01); *B64C 2201/108* (2013.01); *B64D 41/00* (2013.01); *B64D 2041/005* (2013.01); *B64D 2211/00* (2013.01); *B64D 2221/00* (2013.01)

(56) References Cited

U.S. PATENT DOCUMENTS

| | | |
|---|---|---|
| 8,296,036 B2 | 10/2012 | Matuszeski et al. |
| 8,352,097 B2 | 1/2013 | Crumm et al. |
| 8,598,852 B2 | 12/2013 | Gilmore |
| 2016/0221683 A1 | 8/2016 | Roberts et al. |

FOREIGN PATENT DOCUMENTS

| | | |
|---|---|---|
| CN | 102157971 A | 8/2011 |
| CN | 102355044 A | 2/2012 |
| CN | 102837696 A | 12/2012 |
| CN | 103332296 A | 10/2013 |
| CN | 103534134 A | 1/2014 |
| CN | 103847970 A | 6/2014 |
| CN | 203854524 U | 10/2014 |
| CN | 104810892 A | 7/2015 |
| JP | 2000134811 A | 5/2000 |
| JP | 2000217265 A | 8/2000 |

OTHER PUBLICATIONS

EnergyOR Technologies Inc. High Density Stacks. Available at http://energyor.com/technology/high-density-stacks. Accessed Jul. 6, 2017.

International search report and written opinion dated Oct. 14, 2016 for PCT Application No. PCT/CN2015/100211.

MarEx. World's First Fuel Cell Drone Unveiled. The Maritim Executive. May 13, 2015.

Chi Xu, "Research on System Design and Energy", Jul. 15, 2015. pp. 1-46.

UAV HYBRID POWER SYSTEMS AND METHODS

CROSS-REFERENCE

This application is a continuation application of U.S. patent application Ser. No. 15/476,583, filed on Mar. 31, 2017, which is a continuation application of International Application No. PCT/CN2015/100211, filed on Dec. 31, 2015. The above-referenced applications are hereby incorporated by reference.

BACKGROUND

Aerial vehicles such as unmanned aerial vehicles (UAVs) can be used for performing surveillance, reconnaissance, and exploration tasks for military and civilian applications. Such aerial vehicles may carry a payload configured to perform a specific function.

Conventional aerial vehicles may include a multi-rotor structure powered by an energy source such as a battery. When an aerial vehicle undergoes sudden acceleration during an aerial maneuver, a high discharge current may be needed to power the aerial vehicle to complete the maneuver. In some instances, the energy source of the aerial vehicle may be unable to instantaneously meet the high-current discharge requirement. This limited ability affects the performance and flight time of aerial vehicles, and reduces the usefulness of aerial vehicles in particular applications.

SUMMARY

A need exists to provide power systems and methods that can meet high-current discharge requirements of an aerial vehicle. Preferably such systems and methods can improve performance and increase flight time of the vehicle.

A conventional multi-rotor aerial vehicle typically uses lithium-ion battery as an energy source to power the rotors. However, a flight time of the vehicle may be limited, given that the lithium-ion battery has limited energy density (e.g., about 100-300 Wh/kg) and the multi-rotor structure has high power consumption. The power density of a lithium-ion battery may be about 100-1000 W/Kg. The power density may be associated with the discharge current of the lithium-ion battery, which is measured in C-rate. A discharge of 1C draws a current equal to the rated capacity. For example, a battery rated at 1000 mAh provides 1000 mA for one hour if discharged at 1C rate. The same battery discharged at 0.5C provides 500 mA for two hours. At 2C, the same battery delivers 2000 mA for 30 minutes. 1C is often referred to as a one-hour discharge; a 0.5C is a two-hour discharge; and a 0.1C is a ten-hour discharge. A lithium-ion battery typically has a 3-5C discharge rate, which is insufficient to meet the instantaneous high-current discharge requirement (in some instances, more than 10C) of some multi-rotor aerial vehicles.

The rechargeable battery life of a lithium-ion battery is defined as the number of full charge-discharge cycles before significant capacity loss. Significant capacity loss may occur when the battery's maximum charge capacity is reduced to less than 85% of its original charge capacity. The cycle life of a lithium-ion battery is typically less than 1000 cycles (e.g., about 200 charge-discharge cycles), which limits battery life. As a result, the lithium-ion battery for a UAV may need to be replaced after every about 200 charge-discharge cycles.

The energy density, power density, discharge rate (C-rate), and cycle life of a lithium-ion battery are inter-related, and it may be difficult to achieve an optimal balance between those parameters in multi-rotor aerial vehicles. For example, when the discharge rate performance is improved (e.g., from 3-5C to more than 10C), the energy density and battery life of the lithium-ion battery will be reduced. Conversely, when the energy density and battery life of the lithium-ion battery is increased, the discharge rate performance may be insufficient to meet high-current discharge requirements. As a result, a lithium-ion battery may not be able to simultaneously fulfill the: (1) high-current discharge, (2) extended flight time, and (3) long battery service life requirements of some multi-rotor aerial vehicles.

In some cases, the lithium-ion battery in an aerial vehicle may be replaced by a fuel cell to increase the flight time of the vehicle. A fuel cell has several advantages over a lithium-ion battery. For instance, a fuel cell has a high energy density, e.g., about 800-1000 Wh/Kg, which is about 5-10 times greater than the energy density of a lithium-ion battery. The fuel cell can also be recharged by adding fuel, and can be used without having to be electrically recharged. Unlike a lithium-ion battery, the fuel cell does not undergo charge-discharge capacity losses and therefore has a long service life. However, the power density of a fuel cell (e.g., about 10-500 W/Kg) is lower than that of a lithium-ion battery. Furthermore, a fuel cell typically discharges at a constant voltage and a constant current, and therefore cannot meet the fluctuating high-current discharge requirements of some multi-rotor aerial vehicles.

In some other cases, an aerial vehicle may use a solar cell as an energy source. However, the transfer efficiency of existing commercial solar cells may only range between 10% to 30%. As a result, a solar cell having a significantly large size may be needed to meet the power consumption requirement of the aerial vehicle. On a fixed-wing aircraft, a large-sized solar cell can be mounted on the wings since the aircraft has large wingspan relative to its body. Furthermore, since the energy consumption of a fixed-wing aircraft is rather low, it can be powered solely by the solar cell. In contrast, a multi-rotor aerial vehicle is typically relatively compact compared to a fixed-wing aircraft, and has limited area on which a large-sized solar cell can be mounted. Furthermore, the power consumption of a multi-rotor aerial vehicle is typically higher compared to an equivalent-size fixed-wing aircraft, since the lift for the multi-rotor aerial vehicle is generated almost entirely from the rotors. As a result, a solar cell alone may not be able to power a multi-rotor aerial vehicle. In addition, a solar cell depends on the amount of light illuminating the solar panel. If the illumination is not ideal (e.g., on a cloudy day), the transfer efficiency of the solar cell will decrease, thereby resulting in low current output which may affect the performance and/or flight time of the aerial vehicle.

Accordingly, a need exists to compensate for the deficiencies in the above energy sources, and to provide power systems and methods that can meet the (1) high-current discharge, (2) extended flight time, or (3) long battery service life requirements of some multi-rotor aerial vehicles.

The power systems provided herein can address at least the above need. Examples of such power systems include hybrid power systems comprising two or more different types of energy sources. The energy sources may include rechargeable batteries (e.g., lithium-ion batteries), fuel cells, solar cells, super-capacitors, and/or other types of energy sources. The combination of the energy sources can improve the performance of the aerial vehicle, which enables the aerial vehicle to perform certain high-power maneuvers. Such maneuvers may include acceleration, an increased speed, a change in direction, a change in orientation, or any sudden maneuvers of the aerial vehicle that require a high discharge current to be provided instantaneously and/or for an extended period of time. The service life and reliability of the hybrid power system can also be improved by using different energy sources in combination, since the high-current discharge need not be provided solely by one energy source (which may result in over-depletion of that energy source). The service life of the hybrid power system may be improved by at least 5%, 10%, 20%, 30%, 40%, 50%, 100%, 150%, 200%, 250%, or more than 250%. Furthermore, the hybrid power systems can enable increased flight time which increases the range of travel for the vehicle. The flight time/range may be increased by at least 5%, 10%, 20%, 30%, 40%, 50%, or more than 50%. The increased range may be particularly useful when the aerial vehicle is used to deliver items, spray an environment, or patrol or scan an area.

According to an aspect of the invention, a hybrid power system may be provided. The hybrid power system may comprise: a power controller adapted to be in communication with a first power source, a second power source, and a load. The power controller may be configured to: detect whether a current drawn by the load exceeds a predetermined threshold; control discharging of the first power source without permitting discharging of the second power source to power the load when the current drawn by the load is less than the predetermined threshold current; and control discharging of the first power source and the second power source to power the load when the current drawn by the load is greater than the predetermined threshold current.

An unmanned aerial vehicle (UAV) may be provided in accordance with an aspect of the invention. The UAV may comprise: a load comprising at least one propulsion unit; and a power controller adapted to be in communication with a first power source, a second power source, and the load. The power controller may be configured to: detect whether a current drawn by the load exceeds a predetermined threshold; control discharging of the first power source without permitting discharging of the second power source to power the load when the current drawn by the load is less than the predetermined threshold current; and control discharging of the first power source and the second power source to power the load when the current drawn by the load is greater than the predetermined threshold current.

Further aspects of the invention may be directed to a method for controlling power delivery. The method may comprise: detecting whether a current drawn by the load exceeds a predetermined threshold; controlling, with aid of one or more processors, discharging of the first power source without permitting discharging of the second power source to power the load when the current drawn by the load is less than the predetermined threshold current; and controlling, with the aid of the one or more processors, discharging of the first power source and the second power source to power the load when the current drawn by the load is greater than the predetermined threshold current.

A hybrid power system may be provided in accordance with another aspect of the invention. The hybrid power system may comprise: a power controller adapted to be in communication with a first power source, a second power source, and a load. The power controller may be configured to: control discharging of the first power source without permitting discharging of the second power source to power the load when a power drawn by the load is greater than a predetermined threshold power for a time period; and control discharging of the second power source to power the load when the power drawn by the load is greater than the predetermined threshold power starting from when the time period ends.

An unmanned aerial vehicle (UAV) may be provided in accordance with an additional aspect of the invention. The UAV may comprise: a load comprising at least one propulsion unit; and a power controller adapted to be in communication with a first power source, a second power source, and the load. The power controller may be configured to: control discharging of the first power source without permitting discharging of the second power source to power the load when a power drawn by the load is greater than a predetermined threshold power for a time period; and control discharging of the second power source to power the load when the power drawn by the load is greater than the predetermined threshold power starting from when the time period ends.

Further aspects of the invention may be directed to a method for controlling power delivery. The method may comprise: controlling, with aid of one or more processors, discharging of the first power source without permitting discharging of the second power source to power the load when a power drawn by the load is greater than a predetermined threshold power for a time period; and controlling, with the aid of the one or more processors, discharging of the second power source to power the load when the power drawn by the load is greater than the predetermined threshold power starting from when the time period ends.

A hybrid power system may be provided in accordance with a further aspect of the invention. The hybrid power system may comprise: a power controller adapted to be in communication with a first power source, a second power source, and a load. The power controller may be configured to: control charging of the second power source by the first power source when a current drawn by the load is less than a predetermined threshold current, and when the second power source is in an at least partially depleted charge state; and control discharging of at least one of the first power source and the second power source to power the load when the current drawn by the load is greater than the predetermined threshold current.

An unmanned aerial vehicle (UAV) may be provided in accordance with a further aspect of the invention. The UAV may comprise: a load comprising at least one propulsion unit; and a power controller adapted to be in communication with a first power source, a second power source, and the load. The power controller may be configured to: control charging of the second power source by the first power source when a current drawn by the load is less than a predetermined threshold current, and when the second power source is in an at least partially depleted charge state; and control discharging of at least one of the first power source and the second power source to power the load when the current drawn by the load is greater than the predetermined threshold current.

Further aspects of the invention may be directed to a method for controlling power delivery. The method may comprise: controlling, with aid of one or more processors, charging of the second power source by the first power source when a current drawn by a load is less than a predetermined threshold current, and when the second power source is in an at least partially depleted charge state; and controlling, with the aid of the one or more processors, discharging of at least one of the first power source and the second power source to power the load when the current drawn by the load is greater than the predetermined threshold current.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

It shall be understood that different aspects of the invention can be appreciated individually, collectively, or in combination with each other. Various aspects of the invention described herein may be applied to any of the particular applications set forth below or for any other types of remotely controlled vehicles or movable objects.

The hybrid power systems and methods provided herein can meet the high-current discharge requirements of an aerial vehicle, and can improve the performance, flight time/range, and battery service life of the vehicle. The hybrid power system may be disposed within a housing of the aerial vehicle. The hybrid power system may comprise two or more power sources, and a power controller configured to control the current discharging of the power sources, as well as charging between the power sources. The power sources may include rechargeable batteries (e.g., lithium-ion batteries), supercapacitors, fuel cells, and/or solar cells. The power controller can control the discharging of the power sources to provide power to one or more propulsion units of the aerial vehicle. In particular, the power controller can control the power sources to provide a current boost to the aerial vehicle during maneuvers that require a high current discharge. The power controller can also control the charging between two or more power sources, such that partially or fully depleted power sources (e.g., those power sources providing the additional current boost) can be recharged. This can improve the readiness of the hybrid power system in meeting various high-current discharge needs during vehicle flight. By using the power sources in combination, the cruise duration of the vehicle can be increased and its mobility improved.

Figure 1:
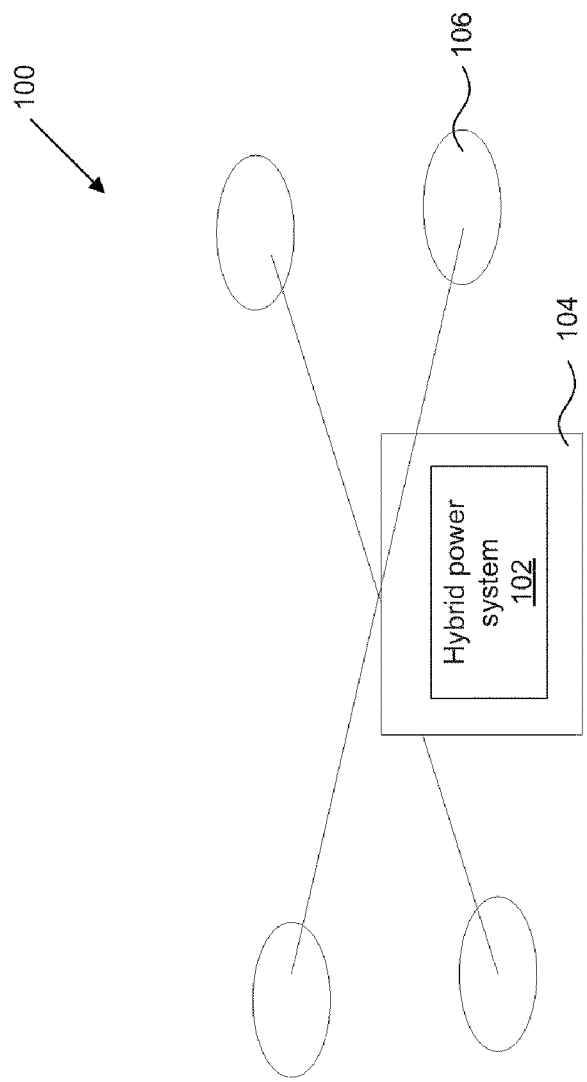
FIG. 1 illustrates an unmanned aerial vehicle (UAV) having a hybrid power system, in accordance with some embodiments.

FIG. 1 illustrates an example of an unmanned aerial vehicle (UAV) 100 that may be powered by a hybrid power system 102. The hybrid power system may be disposed in a housing 104 of the UAV. The hybrid power system may be configured to provide power to the UAV.

Any description herein of a UAV may apply to any type of movable object. The description of the UAV may apply to any type of unmanned movable object (e.g., which may traverse the air, land, water, or space). The UAV may be capable of responding to commands from a remote controller. The remote controller need not be physically connected to the UAV, and may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters. In some other instances, the UAV may be directly and manually controlled by one or more users.

Any description of a UAV may apply to any type of aerial vehicle, and vice versa. The UAV may have one or more propulsion units 106 that may permit the UAV to move about in the air. The propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality of rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV. Rotation of the rotor blades may cause a flow of air. The flow of air may be used to generate lift for the UAV.

The hybrid power system may be used to provide power to the UAV. The hybrid power system may power one or more components of the UAV, or the entirety of the UAV. The hybrid power system may provide power to the propulsion units of the UAV. The hybrid power system may provide power to a flight control system, a navigation system, one or more sensors, a carrier, a payload, a communication system, or any other component of the UAV. The hybrid power system may include a plurality of power sources. For example, the hybrid power system may include one or more energy storage units (e.g., a battery such as a lithium-ion battery, a super-capacitor, etc.), fuel cells, solar generation system (e.g., one or more solar cells), or any other energy storage or generation unit.

The housing of the UAV may include one or more internal cavities. The hybrid power system may be disposed within the housing of the UAV. The hybrid power system may be within one or more internal cavities of the housing. The UAV may include a central body. The cavities and/or hybrid power system may be within the central body of the UAV. The UAV may optionally have one or more arms branching from the central body. The arms may support the propulsion units. One or more branch cavities may be within the arms of the UAV. The branch cavities may be in fluidic communication with a central cavity within the central body. The hybrid power system may be within the central cavity, within a branch cavity, or distributed between the central cavity and/or one or more branch cavities. The housing may or may not include the arms that branch from the central body. In some instances, the housing may be formed from an integral piece that encompasses the central body and the arms. Alternatively, separate housings or pieces may be used to form the central body and arms.

The housing may at least partially isolate the hybrid power system from the external environment. In some instances, the housing may hide the hybrid power system from view. The housing may or may not barometrically isolate the hybrid power system from the external environment. In some instances, one or more vents may be provided that may permit air flow between the external environment and the hybrid power system. The housing may or may not shield the hybrid power system from water or precipitation. In some embodiments, some of the power sources (e.g., supercapacitors and lithium-ion batteries) of the hybrid power system may be disposed within the housing of the UAV, and other power sources (e.g., solar cells) may be disposed on an exterior portion of the housing of the UAV. Any arrangement/configuration of the components of the hybrid power system on the UAV may be contemplated.

Figure 2:
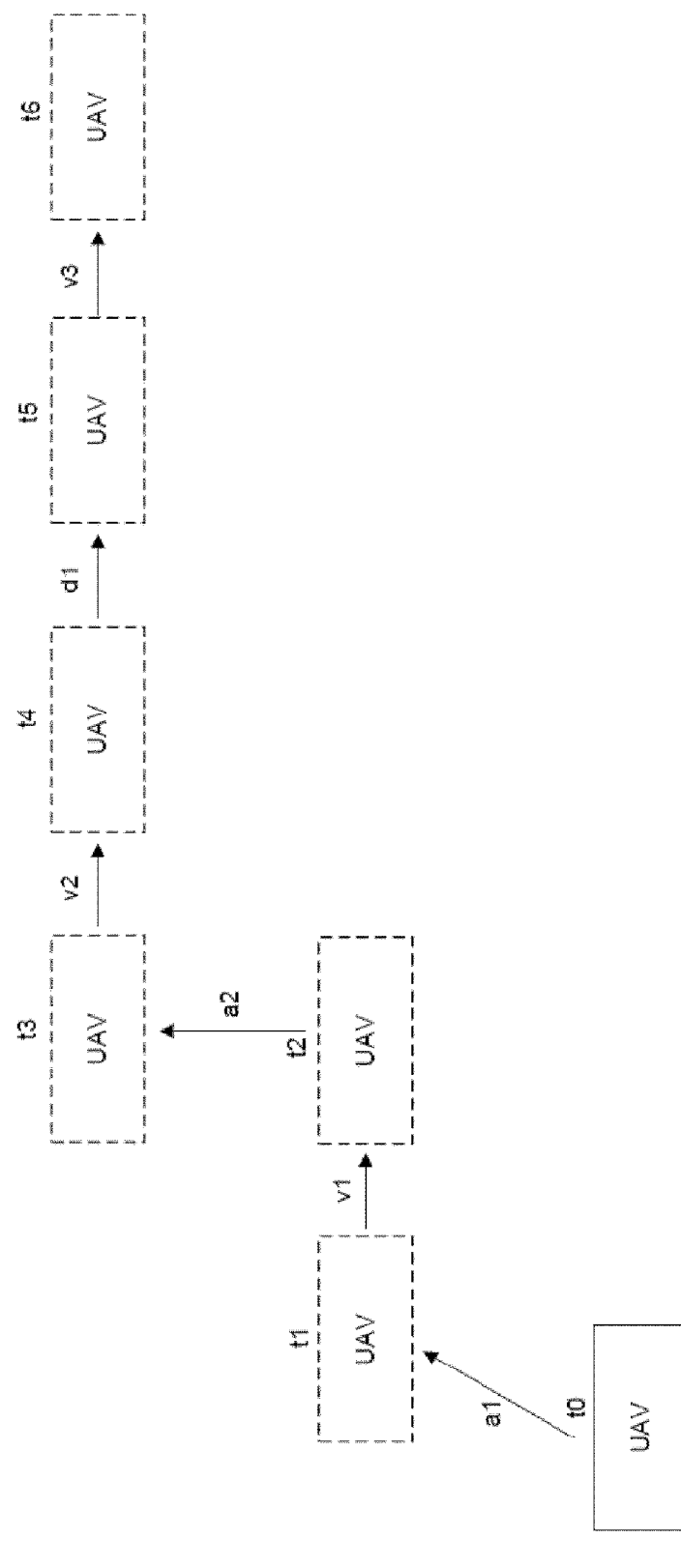
FIG. 2 illustrates an example of a flight trajectory of a UAV.
Figure 3:
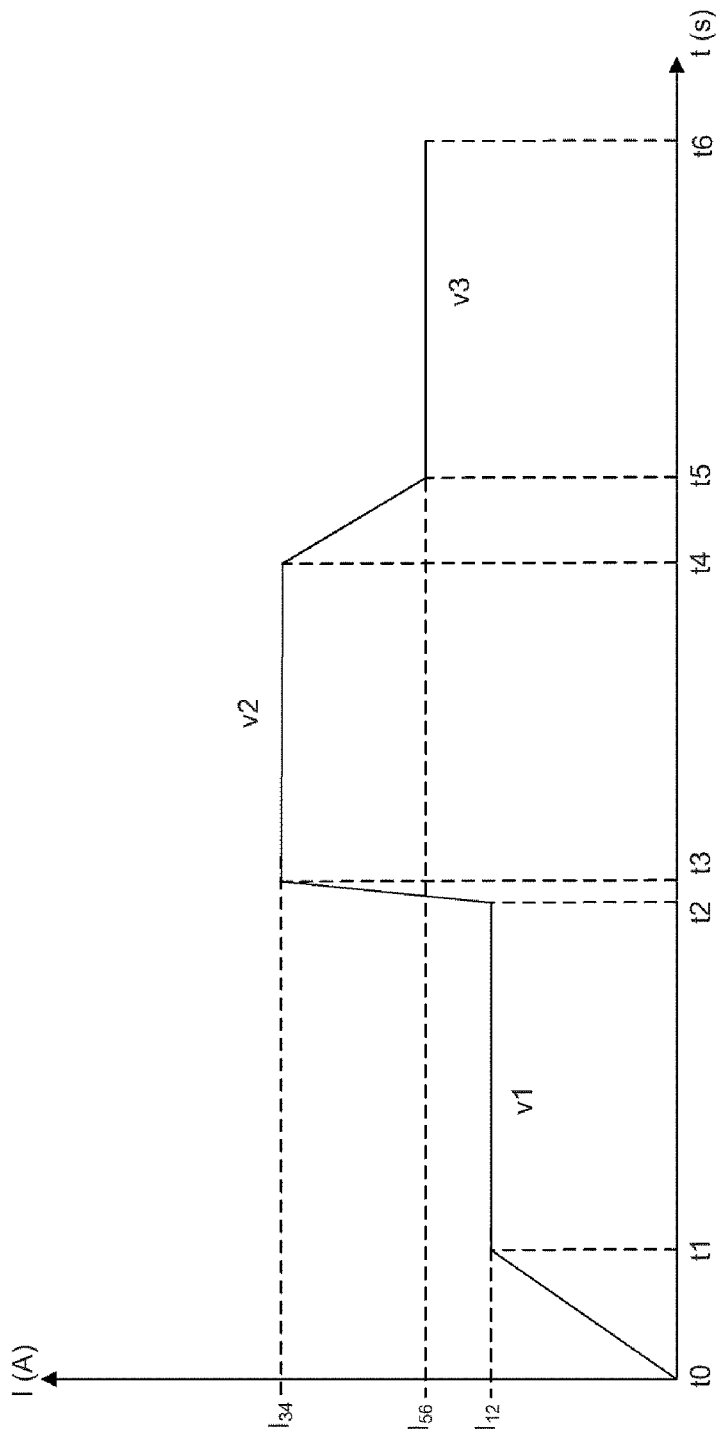
FIG. 3 is a graph of the required current of the UAV at various stages of the flight trajectory.

FIG. 2 illustrates an example of a flight trajectory of a UAV. FIG. 3 is a graph of the required current (i.e., current drawn from the UAV power system) at various stages of the flight trajectory. In some instances, the current drawn from the power system may be proportional to an acceleration and/or speed of the UAV. For example, a low current may be drawn from the power system when the UAV flies at a low speed. Conversely, a high current may be drawn from the power system when the UAV flies at a high speed and/or when the UAV accelerates. For instance, a high current may be drawn when the UAV rapidly accelerates to a high speed from rest or from a lower speed.

Referring to FIGS. 2 and 3, the UAV may be initially at rest. Starting at time $t_0$, a current may be provided to the propulsion units of the UAV, to generate a lift force to propel the UAV into the air. The UAV may accelerate from rest at time t0 to speed v1 at time t1 with an acceleration a1. Thereafter, the UAV may fly at the relatively constant speed v1 from time t1 to t2, such that the propulsion units draw a relatively constant current $I_{12}$ from the power system during that time period.

At time t2, a signal may be provided to the UAV causing the UAV to perform an aerial maneuver. The signal may be provided, for example, from a remote controller configured to control the flight path of the UAV. The maneuver may require additional current to be provided to the propulsion units for increased power. For example, the UAV may accelerate rapidly at acceleration a2 and/or change directions from speed v1 at time t2 to speed v2 at time t3 (where v2>v1), which causes a sharp increase in the current drawn from the power system. Thereafter, the UAV may fly at the relatively constant speed v2 from time t3 to t4, such that the propulsion units draw a relatively constant current $I_{34}$ from the power system during that time period. As shown in FIG. 3, the current $I_{34}$ is greater than the current $I_{12}$ because the speed v2 is greater than the speed v1.

At time t4, a signal may be provided to the UAV causing the UAV to decelerate. For example, the UAV may decelerate from speed v2 at time t4 to speed v3 at time t5 (where v3<v2) with deceleration d1, which causes a decrease in the current drawn from the power system. Thereafter, the UAV may fly at the relatively constant speed v3 from time t5 to t6, such that the propulsion units draw a relatively constant current $I_{56}$ from the power system during that time period. As shown in FIG. 3, the current $I_{56}$ is less than the current $I_{34}$ because the speed v3 is less than the speed v2. When the speed v3 is greater than the speed v1, the relationships between the currents and speeds may be given by v1<v3<v2 and $I_{12}<I_{56}<I_{34}$. In some embodiments, the speed v3 may be less than the speed v1. In other embodiments, the speed v3 may be substantially equal to the speed v1. Any speed/velocity, acceleration, deceleration, flight direction, flight paths (linear and/or curvilinear), orientation, and/or attitude of the UAV in the flight trajectory may be contemplated.

In some cases, a conventional power system (e.g., consisting of only a lithium-ion battery, only a fuel cell, or only a solar cell) may lack the discharge performance capability to deliver the high-current discharge required from time t2 to t4. The hybrid power system according to various embodiments of the invention can address this deficiency, as described below with reference to FIG. 4 through FIG. 18. In particular, the hybrid power system disclosed herein can meet the different current discharge requirements of a UAV at various stages of flight.

Figure 4:
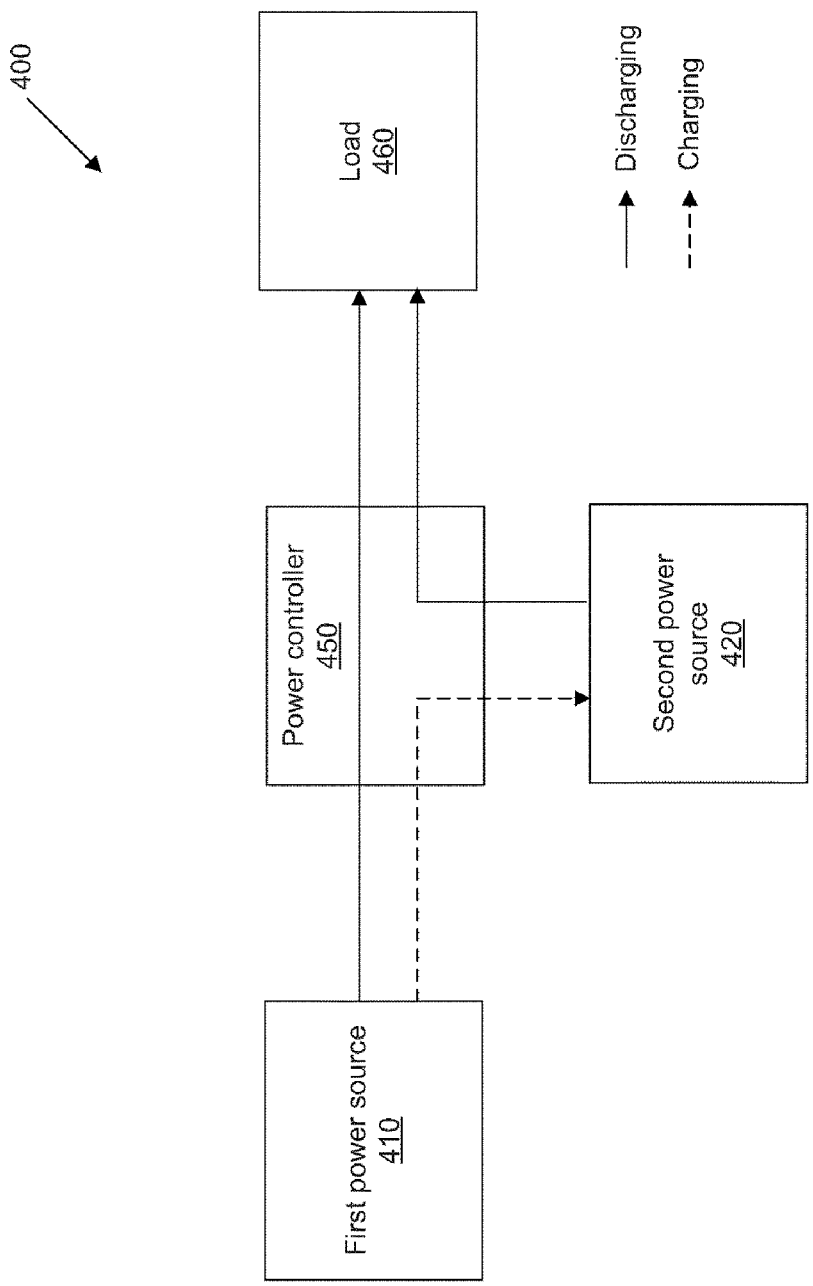
FIG. 4 illustrates a hybrid power system in accordance with some embodiments.

FIG. 4 illustrates a hybrid power system in accordance with some embodiments. Referring to FIG. 4, a hybrid power system 400 may comprise a first power source 410, a second power source 420, and a power controller 450. The hybrid power system may be configured to provide power to a load 460. The load may be components of a vehicle that may consume energy or electricity. The vehicle may be, for example, an unmanned aerial vehicle (UAV). Accordingly, the hybrid power system may be located on the UAV. Electrical contacts may be provided to connect the electrical output of the hybrid power system to the load. In some embodiments, the load may be a component on-board the vehicle. For instance, the load may comprise one or more propulsion units and/or a power consuming unit of the UAV. In some embodiments, one or more sensors may be electrically connected to the hybrid power system, and configured to dynamically measure the electrical output of the hybrid power system to the load, and/or the instantaneous current drawn by the load.

The first power source and the second power source may be selected from a group of energy sources comprising of rechargeable batteries, supercapacitors, fuel cells, and/or solar energy generation systems. Rechargeable batteries may include lithium-ion, flooded lead-acid batteries, NiCd, nickel metal hydride, Li-ion polymer, zinc-air, molten salt batteries, or any type of rechargeable battery that can be used to provide power to the vehicle.

The first power source and the second power source may comprise different types of energy sources. In some embodiments, the first power source may be a fuel cell and the second power source may be a supercapacitor. In other embodiments, the first power source may be a fuel cell and the second power source may be a lithium-ion battery. In some other embodiments, the first power source may be a lithium-ion battery and the second power source may be a supercapacitor. In some alternative embodiments, the first power source and the second power source may comprise the same type of energy source. Each of the above types of energy sources is described as follows.

Rechargeable batteries may be used to power the propulsion units of the aerial vehicle. Such batteries differ from starting, lighting, and ignition (SLI) batteries because such batteries are configured to provide power over sustained periods of time. The rechargeable batteries may include deep cycle batteries that are designed with a high ampere-hour capacity. The rechargeable batteries may be characterized by relatively high power-to-weight ratio, high energy-to-weight ratio, and/or energy density. Smaller and lighter rechargeable batteries can reduce the weight of the vehicle and improve its performance. The rechargeable batteries typically have lower specific energy than liquid fuels (e.g., petroleum) which often impacts the maximum all-electric range of the vehicle. The amount of electricity (i.e. electric charge) stored in the rechargeable batteries may be measured in ampere hours or in coulombs, with the total energy often measured in watt hours.

A lithium-ion battery is a type of rechargeable battery. A lithium-ion battery may comprise a positive electrode, a negative electrode, and an electrolyte. The electrolyte allows lithium ions to move from the negative electrode to the positive electrode during discharge, and from the positive electrode back to the negative electrode when charging. The lithium-ion battery is commonly used in UAVs. However, there is usually a trade-off between the cycle life and the performance of a lithium-ion battery, as previously mentioned. For instance, a lithium-ion battery may be configured to be either high-energy (which allows longer cruise duration) or high-power (which provides high performance), but typically not both. The energy density of the lithium-ion battery may range anywhere from about 100 Wh/Kg, 150 Wh/Kg, 200 Wh/Kg, 250 Wh/Kg, to about 300 Wh/Kg. In some cases, the energy density of the lithium-ion battery may be less than 100 Wh/Kg or greater than 300 Wh/Kg. The power density of the lithium-ion battery may range anywhere from about 100 W/Kg, 200 W/Kg, 300 W/Kg, 400 W/Kg, 500 W/Kg, 600 W/Kg, 700 W/Kg, 800 W/Kg, 900 W/Kg, to about 1000 W/Kg. In some cases, the power density of the lithium-ion battery may be less than 100 W/Kg or greater than 1000 W/Kg.

A supercapacitor may be a high-capacity electrochemical capacitor. A supercapacitor is also known as an ultracapacitor. A supercapacitor may have capacitance values greater than 1 farad, 10 farads, 100 farads, or 1000 farads. A supercapacitor may store 10 to 100 times more energy per unit volume or mass than electrolytic capacitors, can accept and deliver charge much faster than batteries (e.g., at least 5%, 10%, 20%, 30%, 40%, 50%, or 100% faster), and can tolerate significantly more charge and discharge cycles than a rechargeable battery. For example, a supercapacitor can undergo a substantially higher number of rapid charge/discharge cycles compared to a lithium-ion battery (e.g., at least 1×, 2×, 3×, 4×, 5×, or 10× more charge/discharge cycles). A supercapacitor can also be used for short-term energy storage and/or for burst-mode power delivery. The energy density of the supercapacitor may range anywhere from about 0.1 Wh/Kg, 0.5 Wh/Kg, 1 Wh/Kg, 5 Wh/Kg, 10 Wh/Kg, 20 Wh/Kg, 30 Wh/Kg, 40 Wh/Kg, to about 50 Wh/Kg. In some cases, the energy density of the supercapacitor may be less than 0.1 Wh/Kg or greater than 50 Wh/Kg. The power density of the supercapacitor may range anywhere from about 100 W/Kg to about $10^6$ W/Kg. In some embodiments, the power density of the supercapacitor may be less than 100 W/Kg. In other embodiments, the power density of the supercapacitor may be greater than $10^6$ W/Kg.

A fuel cell may be a proton-conducting fuel cell. A fuel cell may comprise a cathode, an anode, and an electrolyte. A fuel cell may be configured to receive a first fuel (e.g., hydrogen gas) and a second fuel (e.g., oxygen gas). The hydrogen gas may be provided from a fuel tank located on the UAV. The oxygen gas may be obtained from air in the ambient environment. The electrolyte allows positively charged hydrogen ions (or protons) to move between the two sides of the fuel cell. The anode and cathode contain catalysts that cause the fuel to undergo oxidation reactions that generate positive hydrogen ions and electrons. The hydrogen ions are drawn through the electrolyte after the reactions. At the same time, electrons are drawn from the anode to the cathode through an external circuit, producing direct current electricity. At the cathode, hydrogen ions, electrons, and oxygen react to form water. In some embodiments, to deliver the desired amount of energy, a plurality of fuel cells (e.g., a fuel cell stack) can be combined in series to yield higher voltage, or in parallel to allow a higher current to be supplied. The cell surface area can also be increased in the fuel cell stack, to allow higher current from each cell. A fuel cell may be provided in different designs and configurations, for example, proton exchange membrane fuel cells (PEMFCs), molten carbonate fuel cell (MCFC), phosphoric acid fuel cell (PAFC), solid oxide fuel cell (SOFC), etc. The energy density of the fuel cell may range from about 800 Wh/Kg, 850 Wh/Kg, 900 Wh/Kg, 950 Wh/Kg, to about 1000 Wh/Kg. In some cases, the energy density of the fuel cell may be less than 800 Wh/Kg or greater than 1000 Wh/Kg. The power density of the fuel cell may range anywhere from about 10 W/Kg, 20 W/Kg, 30 W/Kg, 50 W/Kg, 100 W/Kg, 200 W/Kg, 300 W/Kg, 400 W/Kg, to about 500 W/Kg. In some cases, the power density of the fuel cell may be less than 10 W/Kg or greater than 500 W/Kg.

A solar energy generation system may be configured to convert solar energy to electrical energy. A solar energy generation system may include one or more solar cells. The one or more solar cells may be photovoltaic (PV) cells. A solar cell can convert light energy directly into electrical energy using photovoltaic effects. A solar cell may be provided on a top surface of the body or housing of the UAV to receive the maximum amount of sunlight. For instance, one or more solar cells may be provided on a top surface of a central body of the UAV and/or one or more arms of the UAV. The solar cells may optionally also be provided on a side surface of the UAV (e.g., at the central body and/or arms) or a bottom surface of the UAV. The solar cells may be formed on a surface of a housing of the UAV. In some embodiments, the solar cell may be a lightweight thin film solar cell having certain flexibility. The use of flexible solar cells may allow the solar cells to conform to a shape of a surface of the UAV. The solar cells may be applied to a surface of the UAV without significantly altering the aerodynamics of the UAV. In some embodiments, the solar energy generation system may further comprise a DC/DC module for stabilizing the output voltage of the solar cell.

In some alternate embodiments, the UAV may have a separate structure configured to support the solar cells. For instance, a platform, sail, or other surface may be provided or carried by the UAV. This may provide increased surface area for the UAV to collect solar energy. The additional structure may be of a lightweight material. In some instances, the lightweight material may be flexible, or rigid. The work efficiency of the solar cell may be about 1000 $W/m^2$. In some embodiments, the work efficiency of the solar cell may be less than about 1000 $W/m^2$. In other embodiments, the work efficiency of the solar cell may be greater than about 1000 $W/m^2$. A conversion efficiency of the solar cell may range from about 6% to about 26%. In some embodiments, the conversion efficiency of the solar cell may be less than about 6%. In other embodiments, the conversion efficiency of the solar cell may be greater than about 26%.

Two or more types of energy sources can be used in combination to increase the cruise duration and improve the mobility of the UAV, by leveraging their different energy density/power density characteristics. For example, a fuel cell may be selected to have the highest energy density among those energy sources, and can be re-used by simply adding fuel (e.g., hydrogen and oxygen). A supercapacitor may be selected to have the highest power density (i.e., highest discharge rate) among those energy sources, and can thus provide improved UAV performance. A lithium-ion battery may be advantageous in terms of cost, overall performance, and form factor. A solar cell converts solar energy into electrical energy and can be used anywhere that is illuminated by sunlight.

In some embodiments, the fuel cell (which has high energy density) can be used to produce electricity to charge the lithium-ion battery and/or the supercapacitor, to increase the cruise duration of the UAV. The lithium-ion battery and/or the supercapacitor can be used to provide power to the UAV. When the UAV is in a normal flight mode such that the current drawn by the load is less than or equal to a predetermined threshold current, the fuel cell and/or the lithium-ion battery can provide electric power to the UAV. When the UAV is performing sudden actions, such as taking off, accelerating, changing direction, etc., the supercapacitor can be used to provide an instantaneous high current to the UAV. Accordingly, a cruise duration of the UAV can be extended, and a maneuverability and battery life of the UAV can be improved. In some cases, a solar cell can be used in conjunction with one or more of the other energy sources to extend the flight time of the UAV.

The power controller may be configured to control discharging of the first power source and/or the second power source to power the load. In some embodiments, the power controller may be configured to detect whether a current drawn by the load exceeds a predetermined threshold; control discharging of the first power source without permitting discharging of the second power source to power the load when the current drawn by the load is less than the predetermined threshold current; and control discharging of the first power source and the second power source to power the load when the current drawn by the load is greater than the predetermined threshold current.

The power controller may be further configured to control charging of the second power source by the first power source. In some embodiments, the power controller may be configured to control charging of the second power source by the first power source when a current drawn by the load is less than a predetermined threshold current, and when the second power source is in an at least partially depleted charge state; and control discharging of at least one of the first power source and the second power source to power the load when the current drawn by the load is greater than the predetermined threshold current.

The power controller may be co-located with the first power source and the second power source on-board the UAV, for example within the housing of the UAV. The power controller and the first/second power sources may communicate either via wired or wireless connections.

In some embodiments, the power controller may be located remotely from the UAV. For example, the power controller may be disposed in a remote server that is in communication with the UAV. The power controller may be software and/or hardware components included with the server. The server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the program instructions can be implemented in hardware components or combinations of hardware and software such as, for example, ASICs, special purpose computers, or general purpose computers.

The power controller may also be provided at any other type of external device (e.g., a remote controller for controlling the UAV, a tracking device, a target object, any movable object or non-movable object, etc.). In some instances, the power controller may be distributed on a cloud computing infrastructure. In some embodiments, the power controller may be disposed at a base station that is in communication with the UAV. The power controller may be located anywhere, as long as the power controller is capable of controlling the discharging/charging of the first power source and the second power source to power the load.

The UAV may be configured to operate in different flight modes, which determines the amount of current drawn by the load. The different flight modes may include at least a normal flight mode and an advanced flight mode.

The normal flight mode may correspond to a low power cruising flight, whereby the UAV can be powered using a single power source (e.g., using only the first power source or the second power source). The UAV may operate in the normal flight mode when the current drawn by the load is less than or equal to a predetermined threshold current. The predetermined threshold current may correspond to a discharge current $I1$ of the first power source.

In some embodiments, the discharge current $I1$ may correspond to a maximum continuous discharge current of the first power source. The maximum continuous discharge current may correspond to the maximum current at which the first power source can be discharged continuously. The maximum continuous discharge current may define the top sustainable speed and acceleration of the UAV, along with the maximum continuous power of the propulsion units of the UAV.

In other embodiments, the discharge current $I1$ may correspond to the maximum 30-sec discharge pulse current of the first power source. The maximum 30-sec discharge pulse current may correspond to the maximum current at which the first power source can be discharged for pulses of up to 30 seconds. The maximum 30-sec discharge pulse current may define the acceleration performance of the UAV, along with the peak power of the electric motors of the propulsion units. The maximum continuous discharge current and the maximum 30-sec discharge pulse current limits may be defined to prevent excessive discharge rates that may damage the first power source and/or reduce its capacity. In some cases, the above current limits may be defined by a manufacturer of the first power source, a manufacturer of the UAV, and/or an operator of the UAV.

In some further embodiments, the discharge current $I1$ may correspond to a stable output current that is provided from a power source such as a fuel cell or a solar cell.

The advanced flight mode may correspond to high power flight, which may include acceleration, an increased speed, a change in direction, a change in orientation, or any maneuver of the UAV requiring additional current to be provided to the load for increased power. In some instances, the advanced flight mode may include operations of the UAV other than flight maneuvers. Such operations may be characterized by high consumption of electrical energy, for example, when the payload (or weight of the payload) of the UAV increases, or during massive data transmission from the UAV, etc. The UAV may operate in the advanced flight mode when the current drawn by the load is greater than the predetermined threshold current. In some cases, the first power source may be capable of only discharging up to the current $I1$. In some cases, when the current drawn by the load is greater than the predetermined threshold current, using only the first power source to power the load may cause the first power source to be rapidly depleted or damaged, thereby reducing its capacity. To avoid damaging the first power source, the current load may be distributed between the first power source and the second power source during the advanced flight mode. This can protect the first power source from excessive discharge rates, thereby prolonging the service life and improving the reliability of the first power source.

Figure 5:
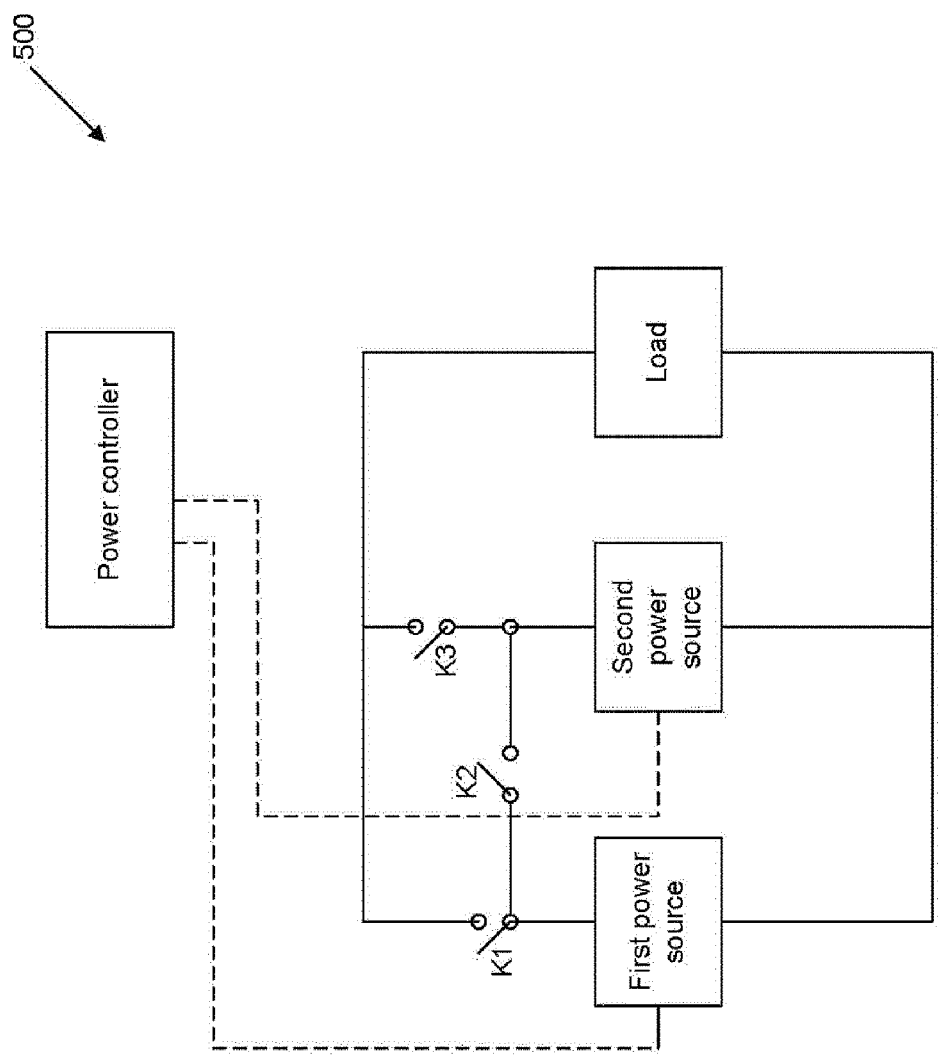
FIG. 5 illustrates a schematic circuit diagram of the hybrid power system of FIG. 4 in accordance with some embodiments.

FIG. 5 illustrates a schematic circuit diagram of the hybrid power system of FIG. 4 in accordance with some embodiments. The hybrid power system may include a plurality of switches connected between the first power source, the second power source, and the load. The switches may include electronic switches such as power MOSFETs, solid state relays, power transistors, and/or insulated gate bipolar transistors (IGBTs). Any type of electronic switch may be provided for controlling the current output of the power sources. An electronic switch may utilize solid state electronics to control charge and discharge of the power sources. In some instances, an electronic switch has no moving parts and/or does not utilize an electro-mechanical device (e.g., traditional relays or switches with moving parts). In some instances, electrons or other charge carriers of the electronic switch are confined to a solid state device. The electronic switch may optionally have a binary state (e.g., switched-on or switched off). The electronic switches may be used to control discharging and/or charging of the power sources. The switches may include a discharge switch $K1$, a charge switch $K2$, and a discharge switch $K3$. The operation of these switches to control the current discharging/charging of the power sources will be described below with reference to FIGS. 6, 7, and 8.

Figure 6:
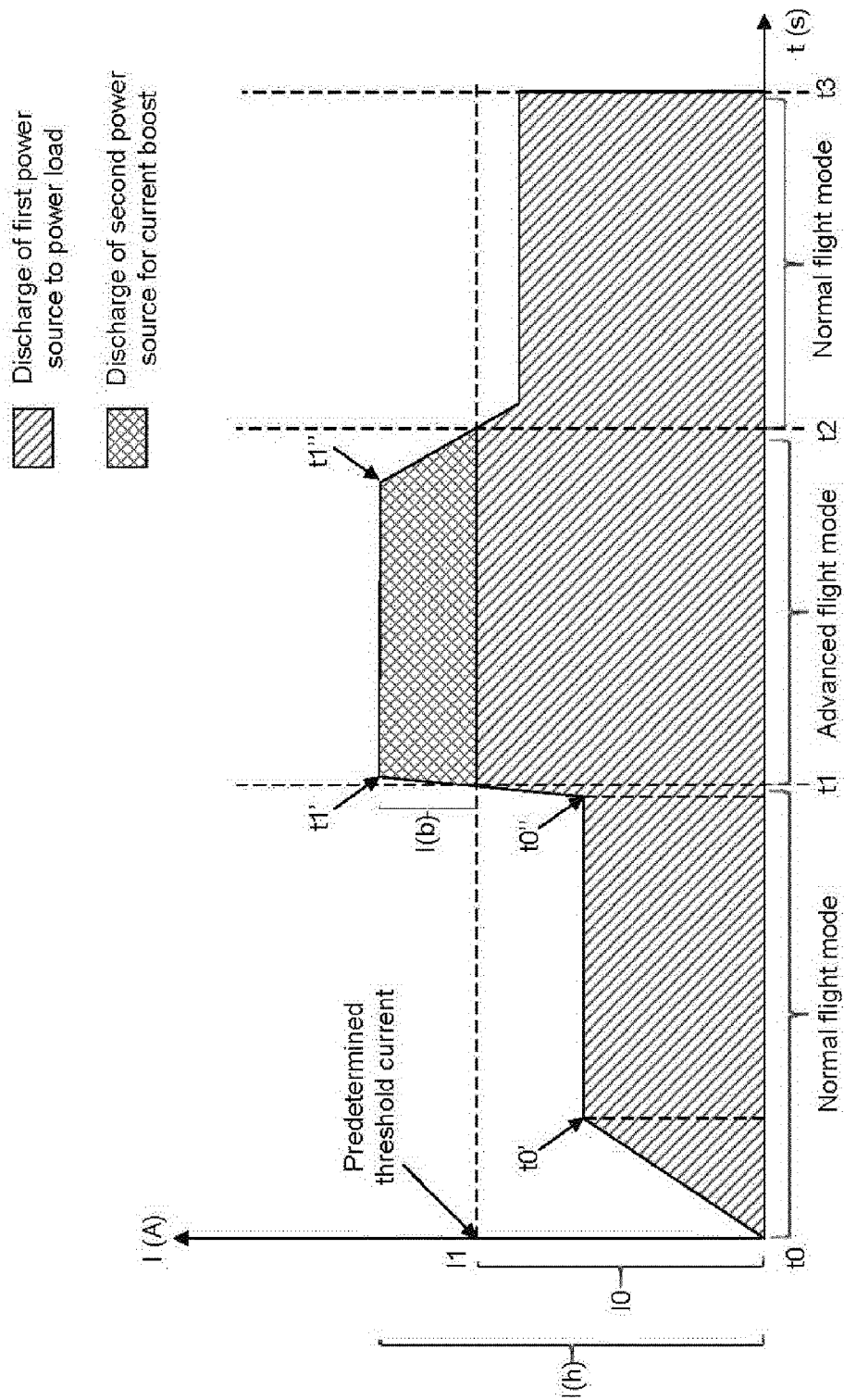
FIG. 6 illustrates a graph of the current I drawn by the load as a function of time t, in accordance with some embodiments.

FIG. 6 illustrates a graph of the current I drawn by the load as a function of time t, in accordance with some embodiments. The UAV may operate in the normal flight mode between time $t0$ to $t1$, and between time $t2$ to $t3$, during which the current drawn by the load is less than or equal to the predetermined threshold current. The predetermined threshold current may correspond to the discharge current $I1$ of the first power source. As previously mentioned, the discharge current $I1$ may correspond to the maximum continuous discharge current or the maximum 30-sec discharge pulse current of the first power source. The UAV may operate in the advanced flight mode between time $t1$ to $t2$, during which the current drawn by the load is greater than the predetermined threshold current. The UAV may be capable of switching between the normal flight mode and the advanced flight mode anytime while the UAV is in flight.

The power controller may be in electrical communication with the first power source, the second power source, and the load. The electrical communication may be via wireless or wired connections. The power controller may be configured to detect whether the current drawn by the load exceeds the predetermined threshold current, using one or more current sensors disposed at different junctions of the hybrid power system. The sensors may be disposed anywhere along electrical lines connecting between the power controller, the first power source, the second power source, and/or the load. The sensors may be configured to detect one or more discharging currents between the first power source, the second power source, and the load. The power controller may be configured to control the discharging of the first power source and/or the second power source based on the required load current.

When the current drawn by the load is less than or equal to the predetermined threshold current, the UAV is in the normal flight mode, and the power controller may control discharging of the first power source without permitting discharging of the second power source to power the load. The current drawn by the load during the normal flight mode may be denoted by I0. The current I0 may be a variable. For example, the current I0 may increase from time t0 to t0', remain constant from time t0' to t0", and increase from time t0" to t1.

Referring to FIG. 5, the discharge switch K1 is disposed between the first power source and the load. The power controller may be configured to turn on the discharge switch K1 when the UAV is in the normal flight mode. Specifically, the power controller may be configured to turn on the discharge switch K1 during time t0-t1 to allow the current I0 to be discharged from the first power source to the load. The power controller may be configured to turn off the discharge switch K1, for example when the UAV has landed or is at rest. Turning off the discharge switch K1 terminates the discharge of the current I0 from the first power source to the load.

When the current drawn by the load is greater than the predetermined threshold current, the UAV is in the advanced flight mode, and the power controller may control discharging of the first power source and the second power source to power the load. The current drawn by the load during the advanced flight mode may be denoted by I(h). Similar to I0, the current I(h) may be a variable. For example, the current I(h) may increase from time t1 to t1', remain constant from time t1' to t1", and decrease from time t1" to t2. Unlike the currents I0 and I(h) which may vary during UAV flight, the predetermined threshold current (I1) is a constant. The relationship between the currents may be given by $I0 \leq I1 < I(h)$.

During the advanced flight mode, the power controller may control the discharging of the first power source and the second power source, such that the first power source discharges the current I1 and the second power source discharges a boost current I(b) to power the load. The boost current I(b) may be given by the difference between the current I(h) and the current I1 [i.e., $I(b)=I(h)-I1$]. As shown in FIG. 6, when the UAV is in the advanced flight mode, any current up to the I1 limit may be provided by the first power source, and any current in excess of the I1 limit may be provided by the second power source. The sharing of the current load between the first power source and the second power source can protect the first power source from damage due to excessive current discharge. The second power source may have a power density such that the second power source is capable of discharging the boost current I(b) to supplement the current I1 discharged by the first power source during the advanced flight mode. In some embodiments, the power density of the second power source may be higher than the power density of the first power source. In some embodiments, the energy density of the first power source may be higher than the energy density of the second power source.

Referring to FIG. 5, the discharge switch K3 is disposed between the second power source and the load. The power controller may be configured to turn on the discharge switch K3 at time t1 (in addition to the discharge switch K1 that is already turned on), when the UAV switches from the normal flight mode to the advanced flight mode. Specifically, the power controller may be configured to turn on the discharge switch K3 during time t1-t2 to allow the boost current I(b) to be discharged from the second power source to the load. The boost current I(b) serves to supplement the current I1 that is being discharged from the first power source to the load during the advanced flight mode. The power controller may be configured to turn off the discharge switch K3 at time t2 when the UAV switches from the advanced flight mode back to the normal flight mode. Turning off the discharge switch K3 terminates the discharge of the boost current I3 from the second power source to the load. The discharge switch K1 continues to be turned on during the normal flight mode during time t2-t3, so that the current I0 can be discharged from the first power source to the load.

In some embodiments (not shown), when the UAV is in the advanced flight mode, the first power source may provide a current that is less than I1, and the second power source may provide any additional current that is required to sum up to I(h). The ratio of the current provided by the first power source to the current provided by the second power source may be 1:1, 2:1, 3:1, 4:1, 5:1, 6:1, 7:1, 8:1, 9:1, 10:1, or greater than 10:1. In other instances, the ratio of the current provided by the second power source to the current provided by the first power source may be 2:1, 3:1, 4:1, 5:1, 6:1, 7:1, 8:1, 9:1, 10:1, or greater than 10:1. Any ratio between the currents provided by the first power source and the second power source during the advanced flight mode may be contemplated.

In some embodiments (not shown), when the UAV is in the normal flight mode, the first power source and the second power source may collectively provide the current I0 to power the load. For example, when the charge state of the first power source is less than a predetermined charge state (e.g., less than about 100%, 90%, 80%, 70%, 60%, 50%, 40%, 30%, 20%, or 10%), the second power source can be used in conjunction with the first power source to provide power during the normal flight mode. The ratio of the current provided by the first power source to the current provided by the second power source may be 1:1, 2:1, 3:1, 4:1, 5:1, 6:1, 7:1, 8:1, 9:1, 10:1, or greater than 10:1. In other instances, the ratio of the current provided by the second power source to the current provided by the first power source may be 2:1, 3:1, 4:1, 5:1, 6:1, 7:1, 8:1, 9:1, 10:1, or greater than 10:1. Any ratio between the currents provided by the first power source and the second power source during the normal flight mode may be contemplated.

In some further embodiments (not shown), the second power source may serve as a back-up energy source to the first power source. For example, when the first power source is in a partially depleted charge state or a completely depleted charge state, the power controller may turn off the discharging of the first power source, and control the discharging of only the second power source to power the load, even when the UAV is in the normal flight mode. In such cases, the current I0 to power the load may be solely provided by the second power source.

As previously mentioned, the power controller may be further configured to control charging between the first power source and the second power source. In some embodiments, the power controller can control charging of the second power source by the first power source, when the current drawn by the load is less than the predetermined threshold current, and when the second power source is in a partially depleted charge state or a completely depleted charge state. The charge state of the second power source may be measured using current sampling circuits (e.g., comprising microcontrollers (MCUs) and analog-to-digital converters (ADCs)) disposed at or near the second power source.

In some embodiments, the first power source may be configured to discharge at a voltage V1. The second power source may have a voltage V2 when the second power source is in a fully charged state. When the voltage V1 of the first power source is equal to or higher than the voltage V2 of the second power source (V1≥V2), the power controller can control the first power source to charge the second power source without requiring power boosting.

Alternatively, when the voltage V1 of the first power source is lower than the voltage V2 of the second power source (V1<V2), the power controller can control the first power source to charge the second power source with the aid of power boosting. The power boosting may be provided using a power boost integrated circuit (IC) disposed between the first power source and the second power source. The power boost IC may include a boost converter (e.g., a step-up converter). The boost converter may be a DC-to-DC power converter with an output voltage that is greater than its input voltage. The boost converter may belong to a class of switched-mode power supply (SMPS) comprising at least two semiconductors (a diode and a transistor) and at least one energy storage element, a capacitor, inductor, or the two in combination. In some cases, filters made of capacitors (sometimes in combination with inductors) may be added to the output of the converter to reduce output voltage ripple.

Referring to FIG. 5, the charge switch K2 is disposed between the first power source and the second power source. The power controller may be configured to control the first power source to charge the second power source at a charging current I(c), when the current drawn by the load is less than the predetermined threshold current, and when the second power source is in a partially depleted charge state or a completely depleted charge state. The power controller may be configured to turn off the discharge switch K3 to terminate the boost current I(b) to the load, and turn on the charge switch K2 to allow the charging current I(c) to flow from the first power source to the second power source during charging. In some embodiments, the charging current I(c) may correspond to a difference between the current I1 and the current I0 [i.e., I(c)=I1−I0]. The power controller may be configured to turn off the charge switch K2 when the second power source reaches a predetermined charge state or a fully charged state. The system may further include one or more sensors configured to detect the charging current I(c) from the first power source to the second power source, and/or the charge state of the second power source.

Figure 7:
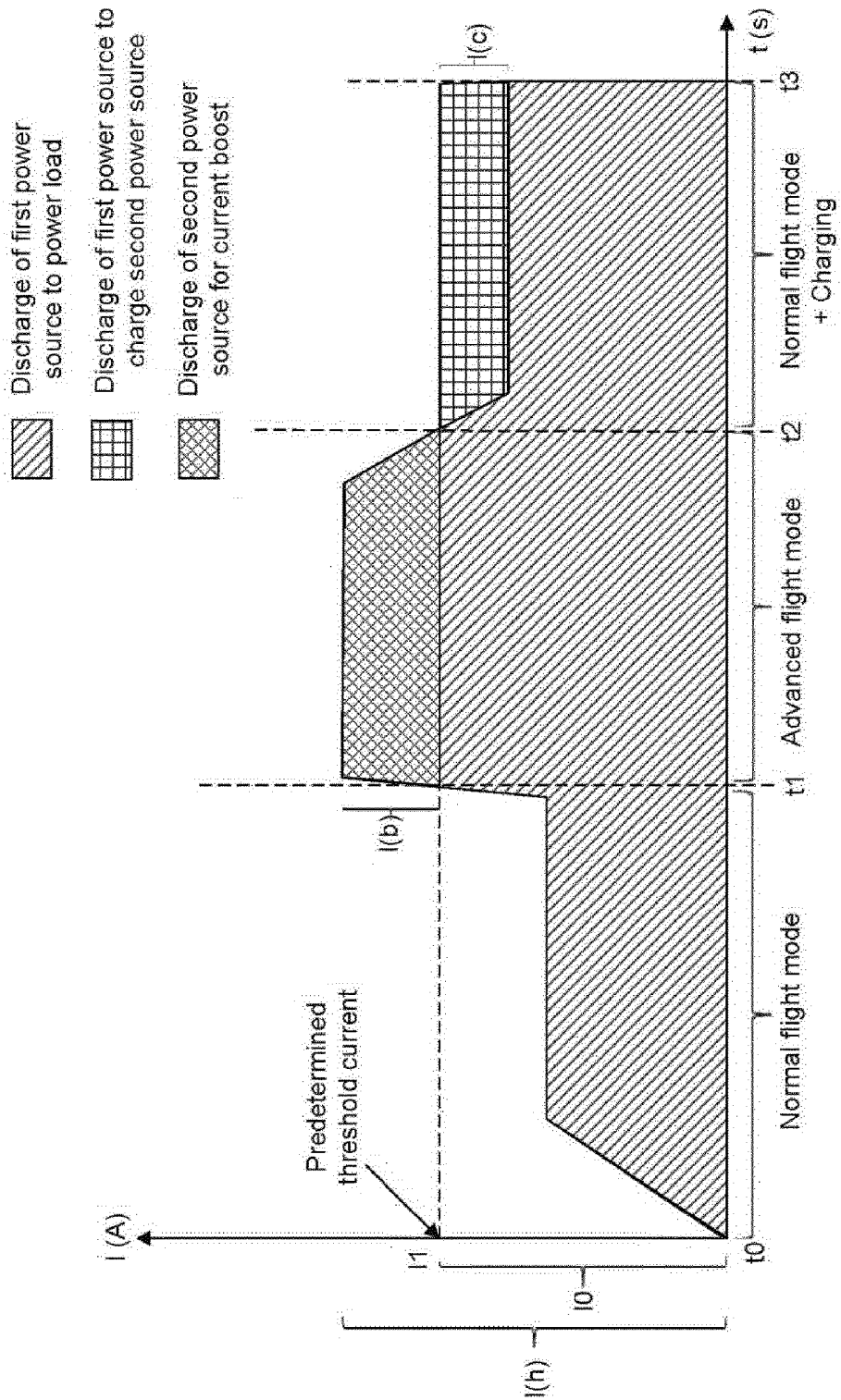
FIG. 7 illustrates a graph of the discharging/charging currents in the hybrid power system of FIG. 4 as a function of time, in accordance with some embodiments.

FIG. 7 illustrates a graph of the discharging/charging currents in the hybrid power system of FIG. 4 as a function of time, in accordance with some embodiments. The graph of FIG. 7 is similar to the graph of FIG. 6 except for the following differences.

In FIG. 6, the first power source discharges the current I0 from time t2-t3 to power the load, and there is no charging of the second power source by the first power source. During time t2-t3, only the discharge switch K1 is turned on, and both the discharge switch K3 and the charge switch K2 are turned off.

In FIG. 7, the first power source discharges the current I1 from time t2-t3, even though the current that is drawn by the load is less than I1. Specifically, a portion of the current I1 is used to power the load, and the remaining portion (I(c)) of the current I1 is used to charge the second power source. During time t2-t3, both the discharge switch K1 and the charge switch K2 are turned on, and the discharge switch K3 is turned off.

Figure 8:
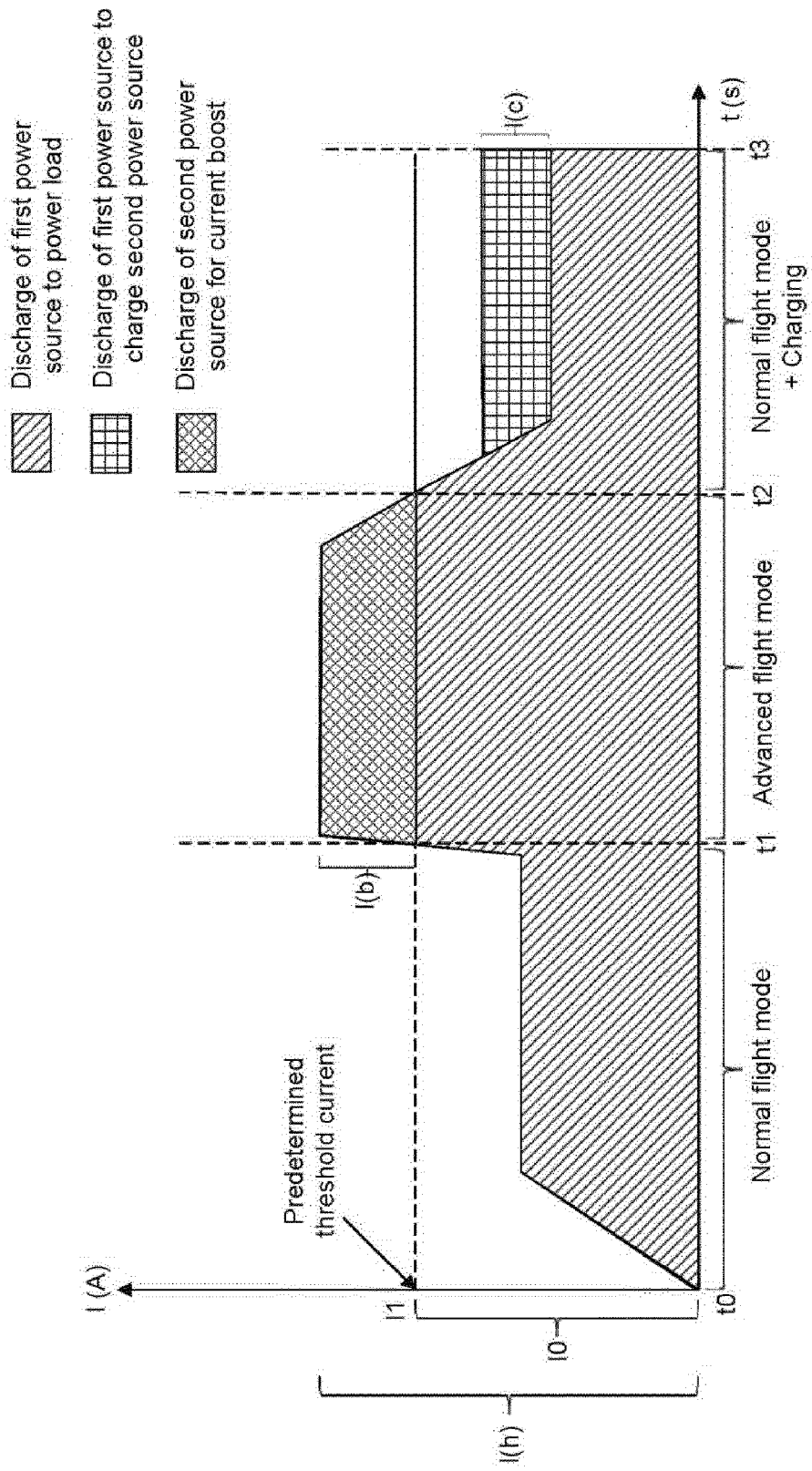
FIG. 8 illustrates a graph of the discharging/charging currents in the hybrid power system of FIG. 4 as a function of time, in accordance with some other embodiments.

In some embodiments, when the load is drawing a low current during the normal flight mode, the first power source need not discharge the current I1 from time t2-t3, but may instead discharge a current that is less than I1. An example of such scenario is depicted in FIG. 8. As shown in FIG. 8, the current during the normal flight mode (with charging) during time t2-t3 is less than I1. A portion of the current may be used to power the load, while the remaining portion (I(c)) of the current may be used to charge the second power source during time t2-t3. The ratio of the current for powering the load to the current for charging the second power source may be 1:1, 2:1, 3:1, 4:1, 5:1, 6:1, 7:1, 8:1, 9:1, 10:1, or greater than 10:1. In some cases, the ratio of the current for charging the second power source to the current for powering the load may be 2:1, 3:1, 4:1, 5:1, 6:1, 7:1, 8:1, 9:1, 10:1, or greater than 10:1. Any ratio between the charging current and discharging current provided by the first power source may be contemplated.

Next, various exemplary embodiments of the hybrid power system of FIG. 4 will be described as follows.

In some embodiments, the first power source may be a fuel cell and the second power source may be a supercapacitor. The fuel cell and the supercapacitor are in electrical communication with the power controller, and are configured to power the load (e.g., propulsion units of the UAV). The power controller may be configured to control the discharging of the fuel cell and the supercapacitor, and also the charging of the supercapacitor by the fuel cell. In operation, the fuel cell may discharge at a substantially constant voltage (V1), constant current (I1), and constant power (W1). In some instances, the voltage V1 and current I1 may correspond to an output of the fuel cell providing a predetermined energy density of the fuel cell. The supercapacitor may be fully charged or partially charged before the UAV begins operation. The voltage of the supercapacitor may be V2. When V1≥V2, the fuel cell can charge the supercapacitor without power boosting. When V1<V2, the fuel cell can charge the supercapacitor with power boosting. When the UAV is in the normal flight mode, the electrical current drawn by the load is I0, where I0≤I1.

During the normal flight mode, the fuel cell may be used to power the UAV. Since I0≤the electric power of the fuel cell alone is sufficient to power the UAV. When the UAV switches from the normal flight mode to the advanced flight mode, the load may draw a current I(h), where I(h)>I1. The power controller may then turn on a supercapacitor discharge switch (e.g., discharge switch K3), such that the supercapacitor provides an additional current boost I(b) to power the UAV, where I(b)=I(h)−I1. The supercapacitor has a high power density, and therefore can be used to provide an instantaneous high current for the UAV to complete the maneuvers during the advanced flight mode.

When the maneuvers are completed, the UAV switches from the advanced flight mode back to the normal flight mode, and the power controller turns off the supercapacitor discharge switch. In some cases, the power controller may turn on a supercapacitor charge switch (e.g., charge switch K2), such that the fuel cell charges the supercapacitor. The power controller may turn off the supercapacitor charge switch when the supercapacitor is fully charged or reaches a predetermined charge state.

In some embodiments, the supercapacitor in the above example may be substituted by a lithium-ion battery. The lithium-ion battery has a higher energy density than a super capacitor, and therefore a cruise duration of the UAV during the normal flight mode can be increased. In such embodiments, the first power source may be a fuel cell and the second power source may be a lithium-ion battery. The fuel cell and the lithium-ion battery are in electrical communication with the power controller, and are configured to power the load (e.g., propulsion units of the UAV). The power controller may be configured to control the discharging of the fuel cell and the lithium-ion battery, and also the charging of the lithium-ion battery by the fuel cell. In operation, the fuel cell may discharge at a substantially constant voltage (V1), constant current (I1), and constant power (W1). The lithium-ion battery may be fully charged or partially charged before the UAV begins operation. The voltage of the lithium-ion battery may be V2. When V1≥V2, the fuel cell can charge the lithium-ion battery without power boosting. When V1<V2, the fuel cell can charge the lithium-ion battery with power boosting. When the UAV is in the normal flight mode, the electrical current drawn by the load is I0, where I0≤I1.

During the normal flight mode, the fuel cell may be used to power the UAV. Since I0≤I1, the electric power of the fuel cell alone is sufficient to power the UAV. When the UAV switches from the normal flight mode to the advanced flight mode, the load may draw a current I(h), where I(h)>I1. The power controller may then turn on a lithium-ion battery discharge switch (e.g., discharge switch K3), such that the lithium-ion battery provides an additional current boost I(b) to power the UAV, where I(b)=I(h)−I1. The lithium-ion battery can be used to provide an instantaneous high current for the UAV to complete the maneuvers during the advanced flight mode.

When the maneuvers are completed, the UAV switches from the advanced flight mode back to the normal flight mode, and the power controller turns off the lithium-ion battery discharge switch. In some cases, the power controller may turn on a lithium-ion battery charge switch (e.g., charge switch K2), such that the fuel cell charges the lithium-ion battery. The power controller may turn off the lithium-ion battery charge switch when the lithium-ion battery is fully charged or reaches a predetermined charge state.

In some further embodiments, the first power source may be a lithium-ion battery and the second power source may be a supercapacitor. The lithium-ion battery and the supercapacitor are in electrical communication with the power controller, and are configured to power the load (e.g., propulsion units of the UAV). The power controller may be configured to control the discharging of the lithium-ion battery and the supercapacitor, and also the charging of the supercapacitor by the lithium-ion battery. In operation, the lithium-ion battery may discharge at a voltage (V1) and up to the current (I1). The current I1 may correspond to the maximum continuous discharge current or the maximum 30-sec discharge pulse current limit of the UAV. The lithium-ion battery and the supercapacitor may be fully charged or partially charged before the UAV begins operation. The voltage of the supercapacitor may be V2. When V1≥V2, the lithium-ion battery can charge the supercapacitor without power boosting. When V1<V2, the lithium-ion battery can charge the supercapacitor with power boosting. When the UAV is in the normal flight mode, the electrical current drawn by the load is I0, where I0≤I1.

During the normal flight mode, the lithium-ion battery may be used to power the UAV. Since I0≤I1, the electric power of the lithium-ion battery alone is sufficient to power the UAV. When the UAV switches from the normal flight mode to the advanced flight mode, the load may draw a current I(h), where I(h)>I1. The power controller may then turn on a supercapacitor discharge switch (e.g., discharge switch K3), such that the supercapacitor provides an additional current boost I(b) to power the UAV, where I(b)=I(h)−I1. The supercapacitor has a high power density, and therefore can be used to provide an instantaneous high current for the UAV to complete the maneuvers during the advanced flight mode.

When the maneuvers are completed, the UAV switches from the advanced flight mode back to the normal flight mode, and the power controller turns off the supercapacitor discharge switch. In some cases, the power controller may turn on a supercapacitor charge switch (e.g., charge switch K2), such that the lithium-ion battery charges the supercapacitor. The power controller may turn off the supercapacitor charge switch when the supercapacitor is fully charged or reaches a predetermined charge state.

Figure 9:
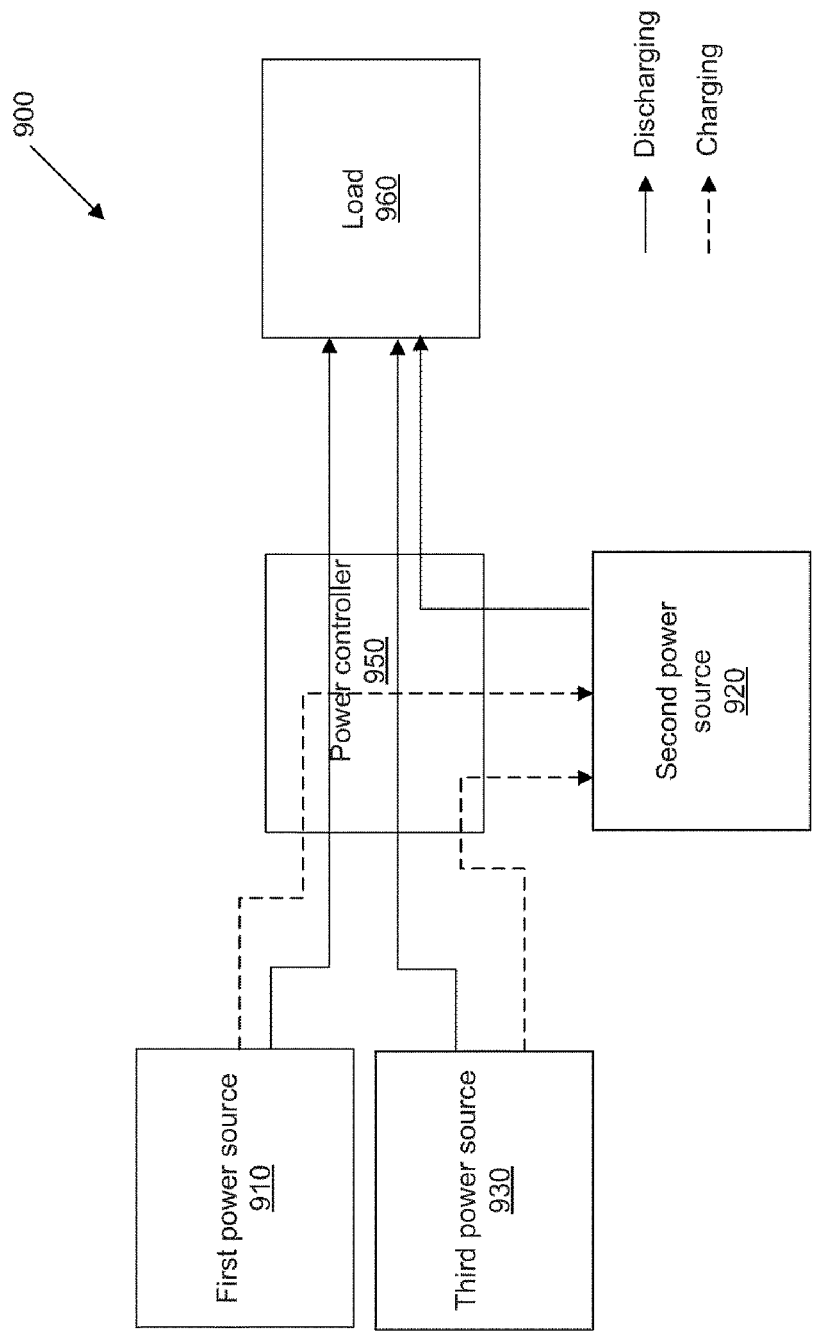
FIG. 9 illustrates a hybrid power system in accordance with some embodiments.

FIG. 9 illustrates a hybrid power system in accordance with some embodiments. Referring to FIG. 9, a hybrid power system 900 may comprise a first power source 910, a second power source 920, a third power source 930, and a power controller 950. The hybrid power system may be configured to provide power to a load 960. The hybrid power system of FIG. 9 may be similar to the one in FIG. 4 except it further includes the third power source. The third power source may be located within the housing of the UAV. In some embodiments, the third power source may be located on an exterior portion of the housing of the UAV. The third power source may be in electrical communication with at least the power controller and the load. The third power source may also be in electrical communication with the second power source and/or the first power source.

The third power source may be configured to provide an additional boost current to supplement the discharge currents from the first power source and the second power source. In some embodiments, the third power source may be configured to charge the second power source when the second power source is in a partially depleted charge state or a completely depleted charge state. In some embodiments, the third power source may serve as a back-up energy source to the first power source and/or the second power source.

The third power source may be selected from the group of energy sources comprising of rechargeable batteries (e.g., lithium-ion batteries), supercapacitors, fuel cells, and solar energy generation systems. The first power source, the second power source, and the third power source may comprise different types of energy sources. For example, in some embodiments, the first power source may be a fuel cell, the second power source may be a supercapacitor, and the third power source may be a solar cell. In other embodiments, the first power source may be a fuel cell, the second power source may be a lithium-ion battery, and the third power source may be a solar cell. In some alternative embodiments, the first power source, the second power source, and the third power source may comprise the same type of energy source.

The power controller may be configured to control discharging of the first power source, the second power source, and/or the third power source to power the load. The power controller may be further configured to control charging of the second power source by at least one of the first power source and the second power source.

Figure 10:
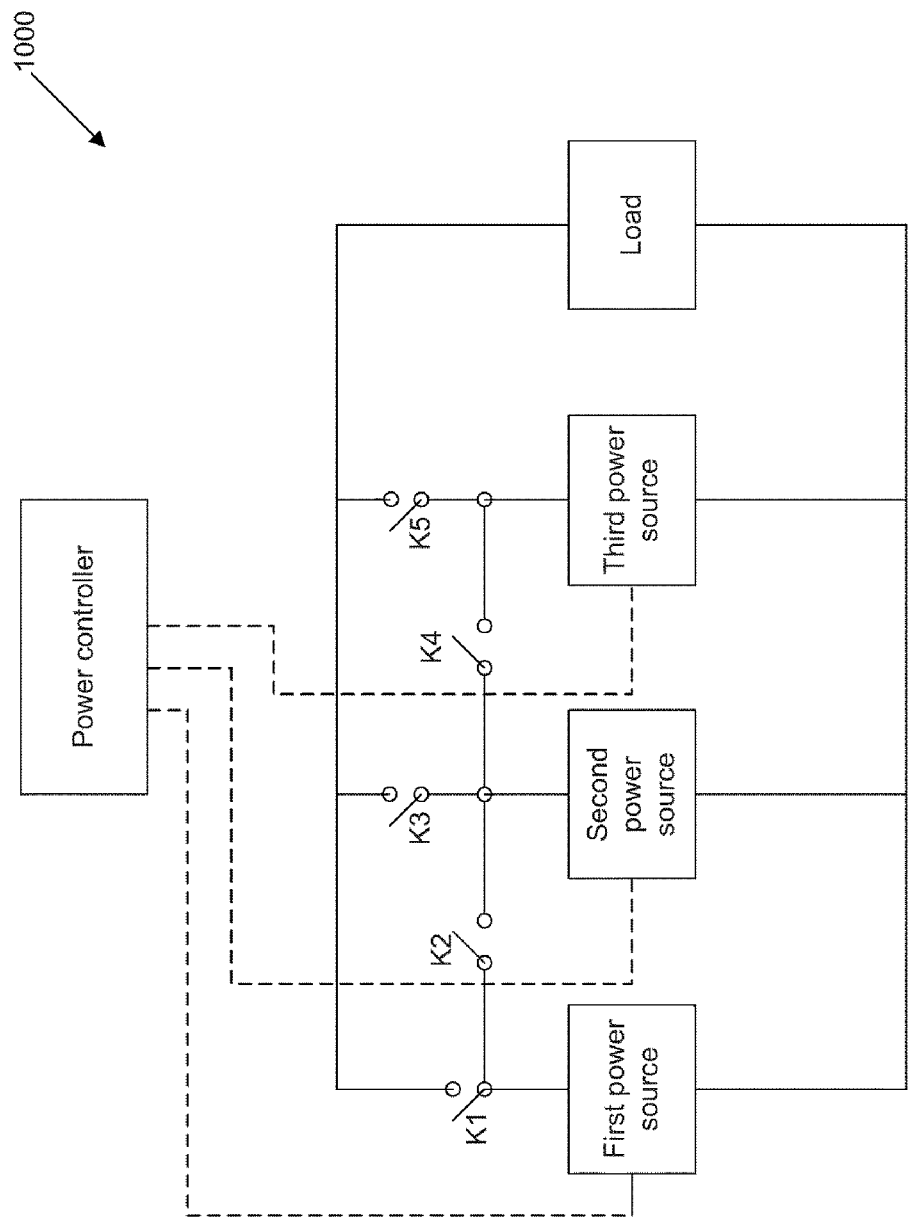
FIG. 10 illustrates a schematic circuit diagram of the hybrid power system of FIG. 9 in accordance with some embodiments.

FIG. 10 illustrates a schematic circuit diagram of the hybrid power system of FIG. 9 in accordance with some embodiments. The circuit diagram of FIG. 10 may be similar to the one in FIG. 5 except it further includes the third power source, a discharge switch K5, and a charge switch K4. The discharge switch K5 can be used to control discharging of the third power source to power the load. The charge switch K4 can be used to control charging of the second power source by the third power source. The discharge switch K5 and the charge switch K4 may include electronic switches such as power MOSFETs, solid state relays, power transistors, and/or insulated gate bipolar transistors (IGBTs). When the charge switch K2 is turned on, the second power source will be charged by the first power source. When the charge switch K4 is turned, the second power source will be charged by the third power source. When the charge switches K2 and K4 are turned (or when the charge switches K4 and K4' are turned on), the second power source will be charged by the first power source and the third power source. The charging may take place during the normal flight mode. In some embodiments, the charging may take place during the advanced flight mode.

Figure 11:
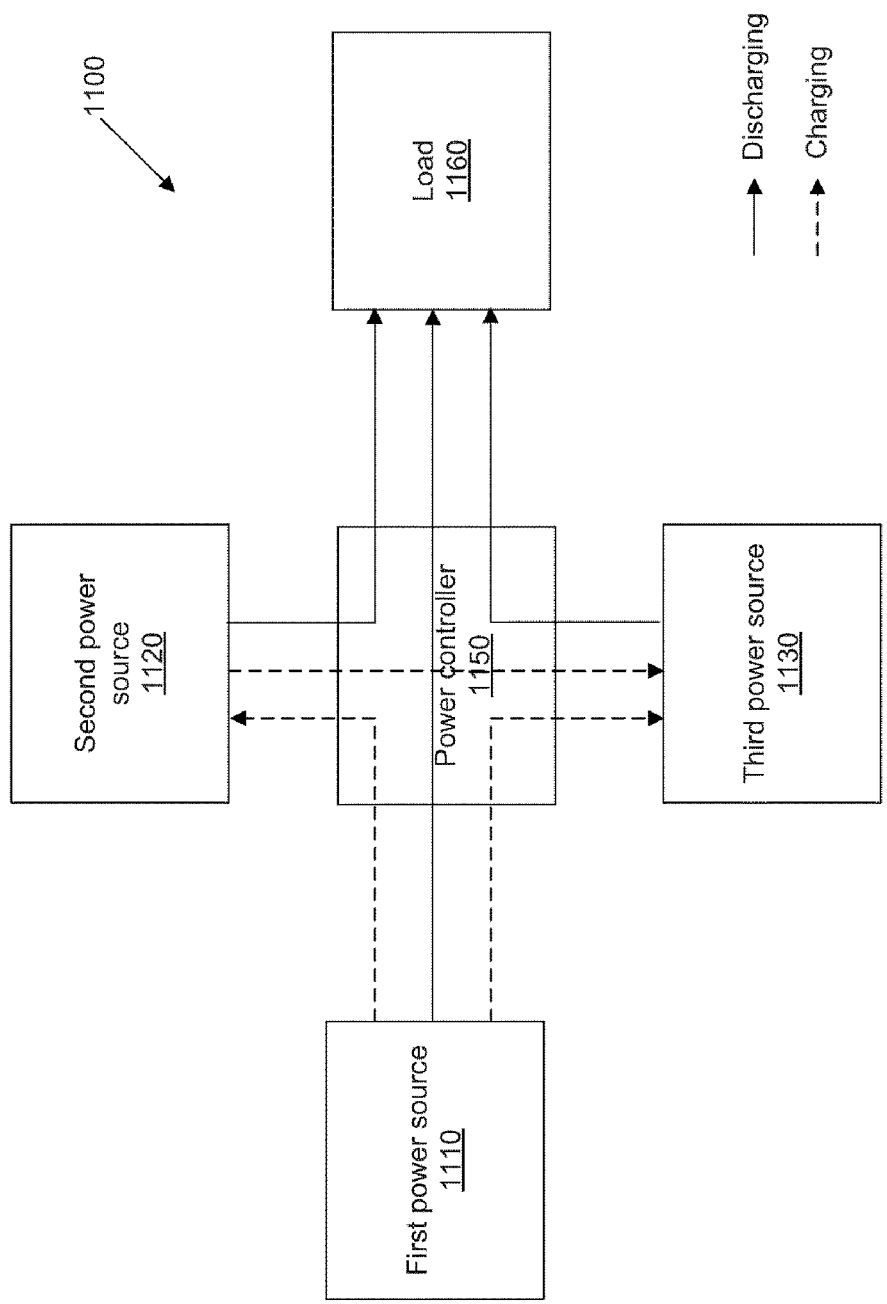
FIG. 11 illustrates a hybrid power system in accordance with some other embodiments.
Figure 12:
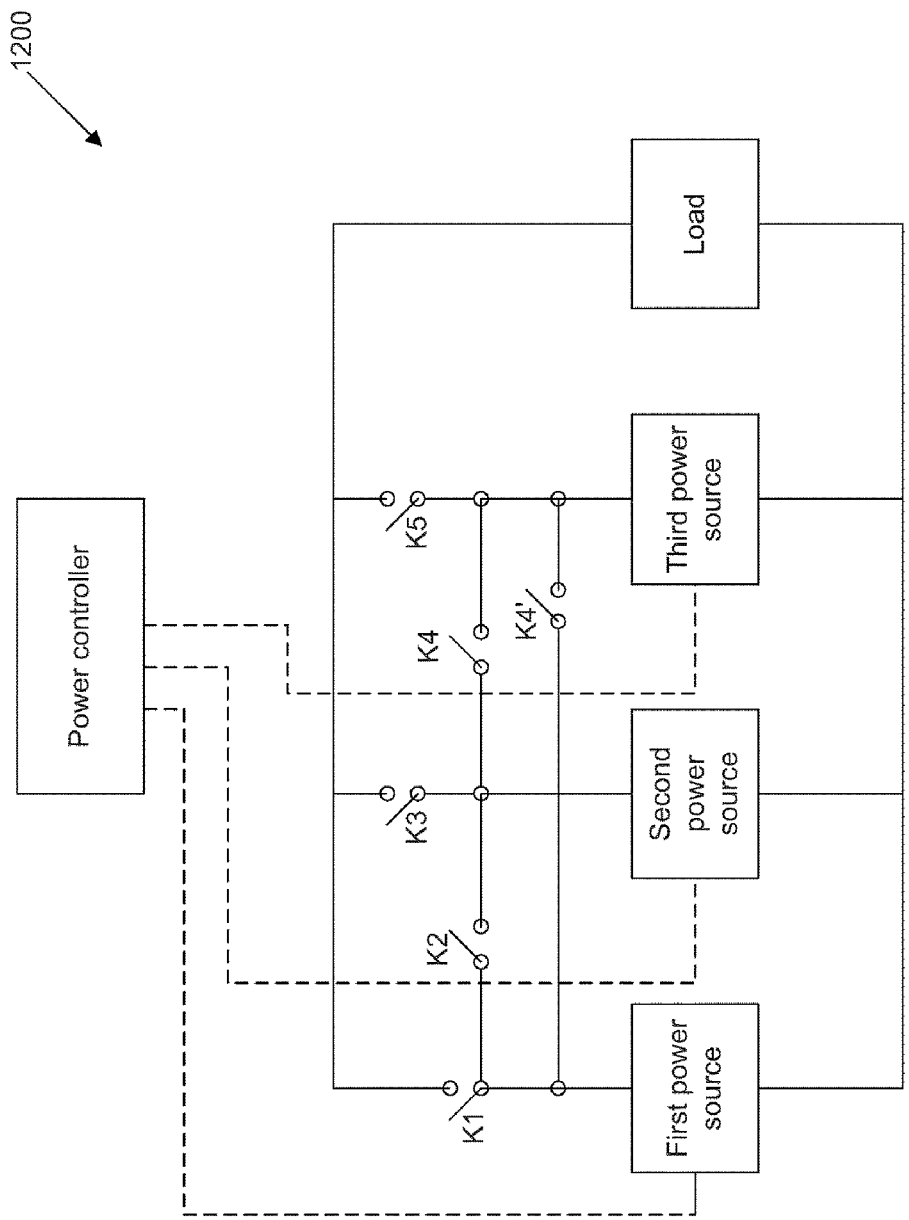
FIG. 12 illustrates a schematic circuit diagram of the hybrid power system of FIG. 11 in accordance with some embodiments.

FIG. 11 illustrates a hybrid power system in accordance with some other embodiments. The hybrid power system of FIG. 11 may be similar to the one in FIG. 9 except for their charging aspects. In FIG. 9, the second power source can be charged by the first power source and/or the second power source. In FIG. 11, the second power source can be charged by the first power source, and the third power source can be charged by the first power source and/or the second power source. This difference in the charging aspects may be reflected in FIG. 12 which illustrates a schematic circuit diagram of the hybrid power system of FIG. 11. As shown in FIG. 12, the circuit further includes a charge K4' connected between the first power source and the third power source. When the charge switch K2 is turned on, the second power source will be charged by the first power source. When the charge switch K4 is turned, the third power source will be charged by the second power source. When the charge switch K4' is turned on, the third power source will be charged by the first power source. When the charge switches K2 and K4 are turned (or when the charge switches K4 and K4' are turned on), the second power source and the third power source will be charged by the first power source. The charging may take place during the normal flight mode. In some embodiments, the charging may take place during the advanced flight mode.

The operation of the switches K1, K2, K3, K4, K5, and K4' to control the current discharging/charging of the first/second/third power sources will be described in more detail below with reference to FIGS. 13, 14, and 15.

Figure 13:
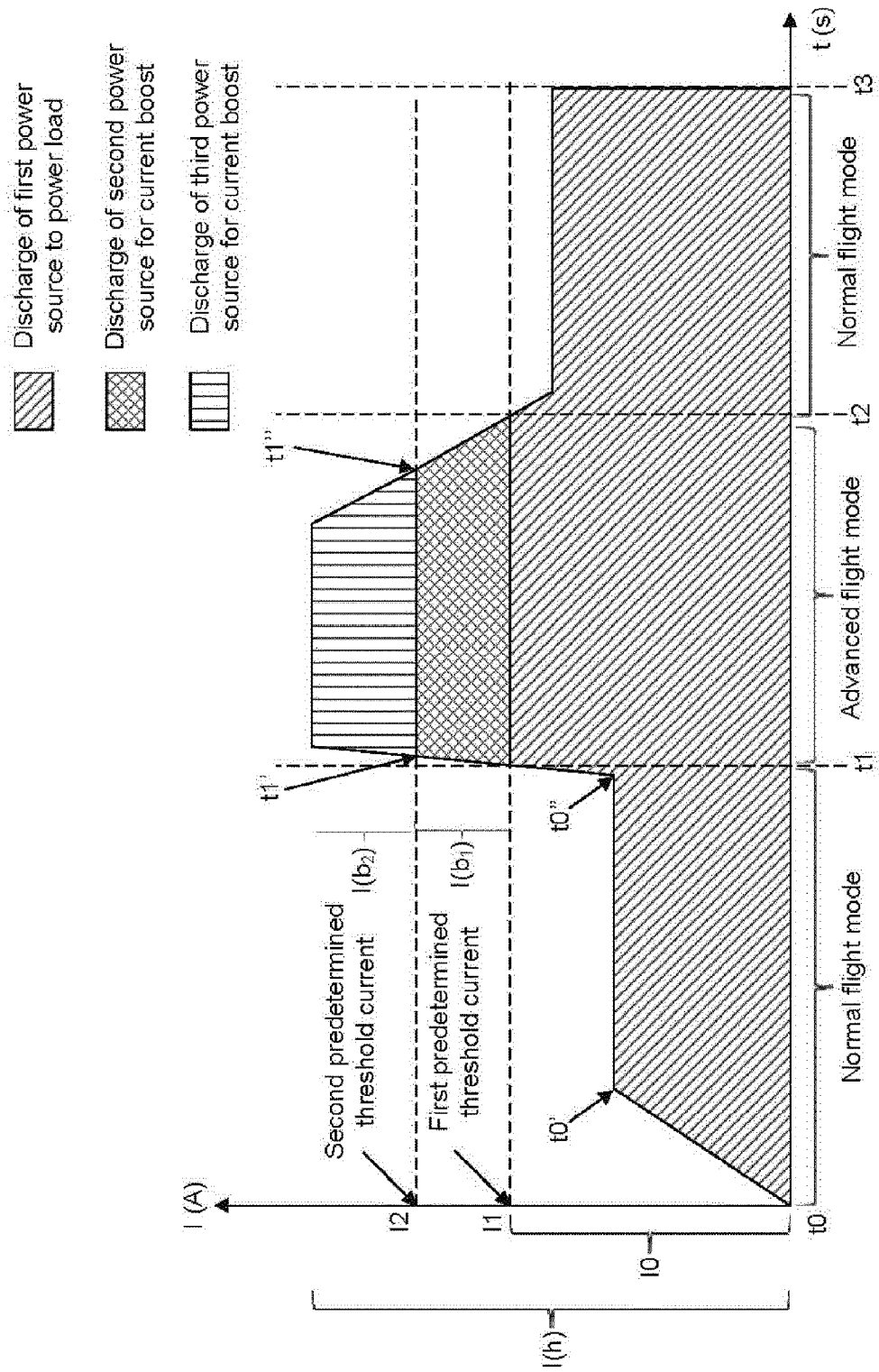
FIG. 13 illustrates a graph of the current I drawn by the load as a function of time t for the hybrid power system of FIG. 9 or 11, in accordance with some embodiments.

FIG. 13 illustrates a graph of the current I drawn by the load as a function of time t for the hybrid power system of FIG. 9 or 11, in accordance with some embodiments. The UAV may operate in the normal flight mode between time t0 to t1, and between time t2 to t3, during which the current drawn by the load is less than or equal to a first predetermined threshold current. The first predetermined threshold current may correspond to the discharge current I1 of the first power source. As previously mentioned, the discharge current I1 may correspond to the maximum continuous discharge current or the maximum 30-sec discharge pulse current of the first power source. The UAV may operate in the advanced flight mode between time t1 to t2, during which the current drawn by the load is greater than the first predetermined threshold current. The UAV may be capable of switching between the normal flight mode and the advanced flight mode anytime while the UAV is in flight.

As shown in FIG. 13, when the UAV is in the advanced flight mode, the current drawn by the load may exceed a second predetermined threshold current during a portion of the time t1-t2. The second predetermined threshold current may correspond to a discharge current I2 of the second power source. The discharge current I2 may correspond to a maximum continuous discharge current or a maximum 30-sec discharge pulse current of the second power source. The second predetermined threshold current may be higher than the first predetermined threshold current, since the second power source may have a higher power density (discharge rate performance) than the first power source. In the example of FIG. 13, the power controller may be configured to: control discharging of the first power source and the second power source without permitting discharging of the third power source to power the load when the current drawn by the load is greater than the first predetermined threshold current and less than the second predetermined threshold current; and control discharging of the first power source, the second power source, and the third power source to power the load when the current drawn by the load is greater than the second predetermined threshold current.

The power controller may be in electrical communication with the first power source, the second power source, the third power source, and the load. The electrical communication may be via wireless or wired connections. The power controller may be configured to detect whether the current drawn by the load exceeds the first predetermined threshold current and/or the second predetermined threshold current, using one or more current sensors disposed at different junctions of the hybrid power system. The sensors may be disposed anywhere along electrical lines connecting between the power controller, the first power source, the second power source, the third power source, and/or the load. The sensors may be configured to detect one or more discharging currents between the first power source, the second power source, the third power source, and the load. The power controller may be configured to control the discharging of the first power source, the second power source, and/or the third power source based on the required load current.

Referring to FIG. 13, when the UAV is in the advanced flight mode, the current drawn by the load may be greater than the first predetermined threshold current but less than the second predetermined threshold current for portions of the time t1-t2 (e.g., between t1-t1' and t1"-t2), and greater than the second predetermined threshold current for the remaining portion of the time t1-t2 (e.g., between t1'-t1").

When the current drawn by the load is greater than the first predetermined threshold current but less than or equal to the second predetermined threshold current, the power controller may control discharging of the first power source and the second power source without permitting discharging of the third power source to power the load. Specifically, the power controller may control the discharging of the first power source and the second power source, such that the first power source discharges the current I1 and the second power source discharges a first boost current $I(b_1)$ to power the load. The first boost current $I(b_1)$ may be given by the difference between the current $I(h)$ and the current I1 [i.e., $I(b_1)=I(h)-I1$]. When the current drawn by the load is greater than the first predetermined threshold current but less than or equal to the second predetermined threshold current, any current up to the I1 limit may be provided by the first power source, and any current in excess of the I1 limit may be provided by the second power source. The sharing of the current load between the first power source and the second power source can protect the first power source from damage due to excessive current discharge. The second power source may have a power density such that the second power source is capable of discharging the first boost current $I(b_1)$ to supplement the current I1 discharged by the first power source. In some embodiments, the power density of the second power source may be higher than the power density of the first power source. In some embodiments, the energy density of the first power source may be higher than the energy density of the second power source.

Referring to FIG. 12, the discharge switch K3 is disposed between the second power source and the load. The power controller may be configured to turn on the discharge switch K3 at time t1 (in addition to the discharge switch K1 that is already turned on), when the UAV switches from the normal flight mode to the advanced flight mode. Specifically, the power controller may be configured to turn on the discharge switch K3 during time t1-t1' to allow the first boost current $I(b_1)$ to be discharged from the second power source to the load. The first boost current $I(b_1)$ serves to supplement the current I1 that is being discharged from the first power source to the load during the advanced flight mode. The power controller may be configured to turn off the discharge switch K3 at time t2 when the UAV switches from the advanced flight mode back to the normal flight mode. Turning off the discharge switch K3 terminates the discharge of the first boost current $I(b_1)$ from the second power source to the load. The discharge switch K1 continues to be turned on during the normal flight mode, so that the current I0 can be discharged from the first power source to the load.

When the current drawn by the load is greater than the second predetermined threshold current, the power controller may control discharging of the first power source, the second power source, and the third power source to power the load, such that the first power source discharges the current I1, the second power source discharges the first boost current $I(b_1)$, and the third power source discharges a second boost current $I(b_2)$ to power the load. The second boost current $I(b_2)$ may be given by the difference between the current $I(h)$ and a sum of the current I1 and the first boost current $I(b_1)$ [i.e., $I(b_2)=I(h)-I(b_1)$]. When the current drawn by the load is greater than the second predetermined threshold current, any current up to the I1 limit may be provided by the first power source, any current in excess of the I1 limit but less than or equal to the I2 limit may be provided by the second power source, and any current in excess of the I2 limit may be provided by the third power source. The sharing of the current load between the first power source, the second power source, and the third power source can protect the first power source and the second power source from damage due to excessive current discharge. The third power source may have a power density such that the third power source is capable of discharging the second boost current $I(b_2)$ to supplement the current I1 discharged by the first power source and the first boost current $I(b_1)$ discharged by the second power source. In some embodiments, the power density of the third power source may be higher than the power density of the second power source, and the power density of the second power source may be higher than the power density of the first power source. In some embodiments, the energy density of the first power source may be higher than the energy density of the second power source, and the energy density of the second power source may be higher than the energy density of the third power source.

Referring to FIG. 12, the discharge switch K5 is disposed between the third power source and the load. The power controller may be configured to turn on the discharge switch K5 at time t1' (in addition to the discharge switches K1 and K3 that are already turned on), when the current drawn by the load exceeds the second predetermined threshold current. Specifically, the power controller may be configured to turn on the discharge switch K5 during time t1'-t1" to allow the second boost current $I(b_2)$ to be discharged from the third power source to the load. The second boost current $I(b_2)$ serves to supplement the current I1 that is being discharged from the first power source and the first boost current $I(b_1)$ that is being discharged from the second power source to the load. The power controller may be configured to turn off the discharge switch K5 at time t1" when the current drawn by the load falls below the second predetermined threshold current. Turning off the discharge switch K5 terminates the discharge of the second boost current $I(b_2)$ from the third power source to the load. The discharge switches K1 and K3 continue to be turned on for the duration of time t1"-t2, such that the first power source discharges the current I1 and the second power source discharges the first boost current $I(b_1)$. At time t2, the discharge switch K3 is turned off, and the UAV switches from the advanced flight mode back to the normal flight mode.

In some embodiments (not shown), when the UAV is in the advanced flight mode, the first power source may provide a current that is less than I1, and the second power source and the third power source may provide any additional boost currents that are required to sum up to $I(h)$. The ratio of the currents provided by the first power source, the second power source, and the third power source may be given by x:y:z, where x, y, and z may be any integer.

In some embodiments (not shown), when the UAV is in the normal flight mode, the first power source and the third power source may collectively provide the current I0 to power the load. For example, when the charge state of the first power source is less than a predetermined charge state (e.g., less than about 100%, 90%, 80%, 70%, 60%, 50%, 40%, 30%, 20%, or 10%), the third power source can be used in conjunction with the first power source to provide power to the UAV during the normal flight mode. The ratio of the current provided by the first power source to the current provided by the third power source may be 1:1, 2:1, 3:1, 4:1, 5:1, 6:1, 7:1, 8:1, 9:1, 10:1, or greater than 10:1. In other instances, the ratio of the current provided by the third power source to the current provided by the first power source may be 2:1, 3:1, 4:1, 5:1, 6:1, 7:1, 8:1, 9:1, 10:1, or greater than 10:1. Any ratio between the currents provided by the first power source and the third power source during the normal flight mode may be contemplated.

In some further embodiments (not shown), the third power source may serve as a back-up energy source to the first power source. For example, when the first power source is in a partially depleted charge state or a completely depleted charge state, the power controller may turn off the discharging of the first power source, and control the discharging of only the third power source to power the load, even when the UAV is in the normal flight mode. In such cases, the current I0 to power the load may be solely provided by the third power source.

In some further embodiments (not shown), the third power source may serve as a back-up energy source to the second power source. For example, when the second power source is in a partially depleted charge state or a completely depleted charge state such that the second power source is not capable of delivering the first boost current $I(b_1)$, the power controller may control the discharging of only the first power source and the third power source to power the load during the advanced flight mode. In such cases, the current $I(h)$ to power the load may be solely provided by the first power source and the third power source.

In some embodiments, the third power source may serve as a substitute for the first power source and/or the second power source. For example, the third power source may be used when the first power source and/or the second power source is in a partially depleted charge state or a completely depleted charge state. Any use of the third power source to complement the current discharge of the first power source and the second power source may be contemplated.

As previously mentioned with reference to FIGS. 9 and 10, the power controller may be further configured to control charging of the second power source by the first power source and/or the third power source. For example, the power controller can control charging of the second power source by the first power source and/or third power source when the current drawn by the load is less than the predetermined threshold current, and when the second power source is in a partially depleted charge state or a completely depleted charge state. The charge state of the second power source may be measured using current sampling circuits comprising microcontrollers (MCUs) and analog-to-digital converters (ADCs).

In some embodiments, the third power source may be configured to discharge at a voltage V3. The second power source may have a voltage V2 when the second power source is in a fully charged state. When the voltage V3 of the third power source is equal to or higher than the voltage V2 of the second power source (V3≥V2), the power controller can control the third power source to charge the second power source without requiring power boosting.

Alternatively, when the voltage V3 of the third power source is lower than the voltage V2 of the second power source (V3<V2), the power controller can control the third power source to charge the second power source with the aid of power boosting. The power boosting may be provided using a power boost integrated circuit (IC) disposed between the second power source and the third power source.

The second power source may be charged using only the first power source, only the second power source, or a combination of the first power source and the second power source. Referring to FIGS. 9 and 10, the charge switch K4 is disposed between the third power source and the second power source, and the charge switch K2 is disposed between the first power source and the second power source. The second power source can be charged using the first power source by turning on the charge switch K2. Likewise, the second power source can be charged using the third power source by turning on the charge switch K4. In addition, the second power source can be charged using both the first power source and the third power source by turning on both the charge switches K2 and K4. The charging of the second power source using the first power source via the charge switch K2 has been previously described with reference to FIGS. 5 and 7. The following description shall focus on the charging of the second power using only the third power source, and the charging of the second power using both the first power source and the third power source.

The power controller may be configured to control the third power source to charge the second power source at a charging current I(c), when the current drawn by the load is less than the first/second predetermined threshold current, and when the second power source is in a partially depleted charge state or a completely depleted charge state. The power controller may be configured to turn off the discharge switch K3 to terminate the first boost current $I(b_1)$ from the second power source to the load, and turn on the charge switch K4 to allow the charging current I(c) to flow from the third power source to the second power source during charging. In some embodiments, the charging current I(c) may correspond to a difference between the current I1 and the current I0 [i.e., I(c)=I1−I0]. In other embodiments, the charging current I(c) may be greater than a difference between the current I1 and the current I0 [i.e., I(c)>(I1−I0)]. In some other embodiments, the charging current I(c) may be less than a difference between the current I1 and the current I0 [i.e., I(c)<(I1−I0)]. The power controller may be configured to turn off the charge switch K4 when the second power source reaches a predetermined charge state or a fully charged state. The system may further include one or more sensors configured to detect the charging current I(c) from the third power source to the second power source, and/or the charge state of the second power source.

The power controller may be further configured to control the first power source and the third power source to collectively charge the second power source at the charging current I(c), when the current drawn by the load is less than the first/second predetermined threshold current, and when the second power source is in a partially depleted charge state or a completely depleted charge state. The power controller may be configured to: (1) turn off the discharge switch K3 to terminate the first boost current $I(b_1)$ from the second power source to the load, (2) turn on the charge switch K2 to allow a first charge current $I(c_1)$ to flow from the first power source to the second power source, and (3) turn on the charge switch K4 to allow a second charge current $I(c_2)$ to flow from the third power source to the second power source. The power controller may be configured to turn off the discharge switch K3 and turn on the charge switches K2 and K4 simultaneously. In some alternative embodiments, the power controller may be configured to turn off the discharge switch K3 and turn on the charge switches K2 and K4 sequentially. Any order and/or timing of the turning on/off of the switches may be contemplated. The sum of the first charging current $I(c_1)$ and the second charging current $I(c_2)$ may be equal to I(c)[i.e., $I(c)=I(c_1)+I(c_2)$]. In some embodiments, the charging current I(c) may correspond to a difference between the current I1 and the current I0 [i.e., I(c)=I1−I0]. In other embodiments, the charging current I(c) may be greater than a difference between the current I1 and the current I0 [i.e., I(c)>(I1−I0)]. In some other embodiments, the charging current I(c) may be less than a difference between the current I1 and the current I0 [i.e., I(c)<(I1−I0)]. The power controller may be configured to turn off the charge switches K2 and K4 when the second power source reaches a predetermined charge state or a fully charged state. The system may further include one or more sensors configured to detect the charging current $I(c_1)$ from the first power source to the second power source, the charging current $I(c_2)$ from the third power source to the second power source, and/or the charge state of the second power source.

In some embodiments, the ratio of the first charging current $I(c_1)$ to the second charging current $I(c_2)$ may be 1:1, 2:1, 3:1, 4:1, 5:1, 6:1, 7:1, 8:1, 9:1, 10:1, or greater than 10:1. In other embodiments, the ratio of the second charging current $I(c_2)$ to the first charging current $I(c_1)$ may be 2:1, 3:1, 4:1, 5:1, 6:1, 7:1, 8:1, 9:1, 10:1, or greater than 10:1. Any ratio between the first charging current $I(c_1)$ and the second charging current $I(c_2)$ that are provided by the first power source and third power source may be contemplated.

Figure 14:
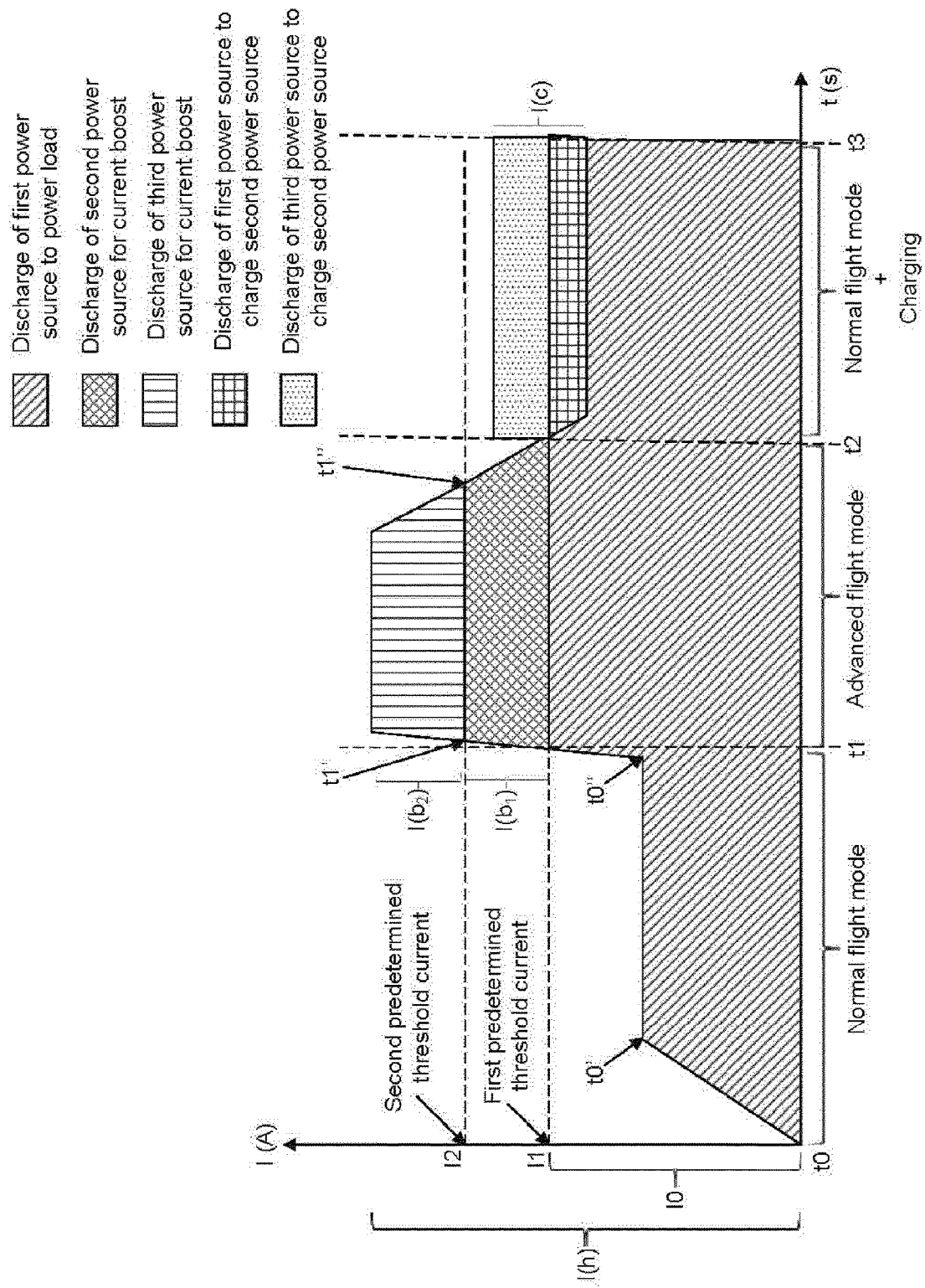
FIG. 14 illustrates a graph of the discharging/charging currents in the hybrid power system of FIG. 9 as a function of time.

FIG. 14 illustrates a graph of the discharging/charging currents in the hybrid power system of FIG. 9 as a function of time, in accordance with some embodiments. The graph FIG. 14 may be similar to the graph of FIG. 13 except for the following differences.

In FIG. 13, the first power source discharges the current I0 from time t2-t3 to power the load, and there is no charging of the second power source by the first power source and/or the third power source. During time t2-t3, only the discharge switch K1 is turned on, and the discharge switches K3/K5 and the charge switches K2/K4 are turned off.

In FIG. 14, the first power source discharges the current I1 from time t2-t3, even though the current that is drawn by the load is less than I1. Specifically, a portion of the current I1 is used to power the load, and the remaining portion of the current I1 (equal to the first charging current $I(c_1)$) is used to charge the second power source. In addition, the third power source discharges the second charging current $I(c_2)$ during time t2-t3 to charge the second power source. As previously described, the charging current $I(c)$ is equal to the sum of $I(c_1)$ and $I(c_2)$. In FIG. 14, the charging current $I(c)$ may be greater than a difference between the current I1 and the current I0 [i.e., $I(c)>(I1-I0)$], since the first power source and the third power source collectively provide the charging current $I(c)$. During time t2-t3, the discharge switch K1 and the charge switches K2/K4 are turned on, and the discharge switch K3 is turned off. The discharge switch K5 may optionally be turned on or off, depending on whether there is a need for the third power source to supplement the first power source to power the load.

In some embodiments, the power controller may be configured to control the discharging of the second power source and the third power source, based on their discharge time durations during the advanced flight mode. FIG. 15 illustrates a graph of the current I drawn by the load as a function of time t for the hybrid power system of FIG. 11, in accordance with those embodiments. The UAV may operate in the normal flight mode between time t0-t1, and between time t2-t3, during which the current drawn by the load is less than or equal to the first predetermined threshold current. The first predetermined threshold current may correspond to the discharge current I1 of the first power source. As previously mentioned, the discharge current I1 may correspond to the maximum continuous discharge current or the maximum 30-sec discharge pulse current of the first power source. The UAV may operate in the advanced flight mode between time t1-t2, during which the current drawn by the load is greater than the first predetermined threshold current. The UAV may be capable of switching between the normal flight mode and the advanced flight mode anytime when the UAV is in flight.

Figure 15:
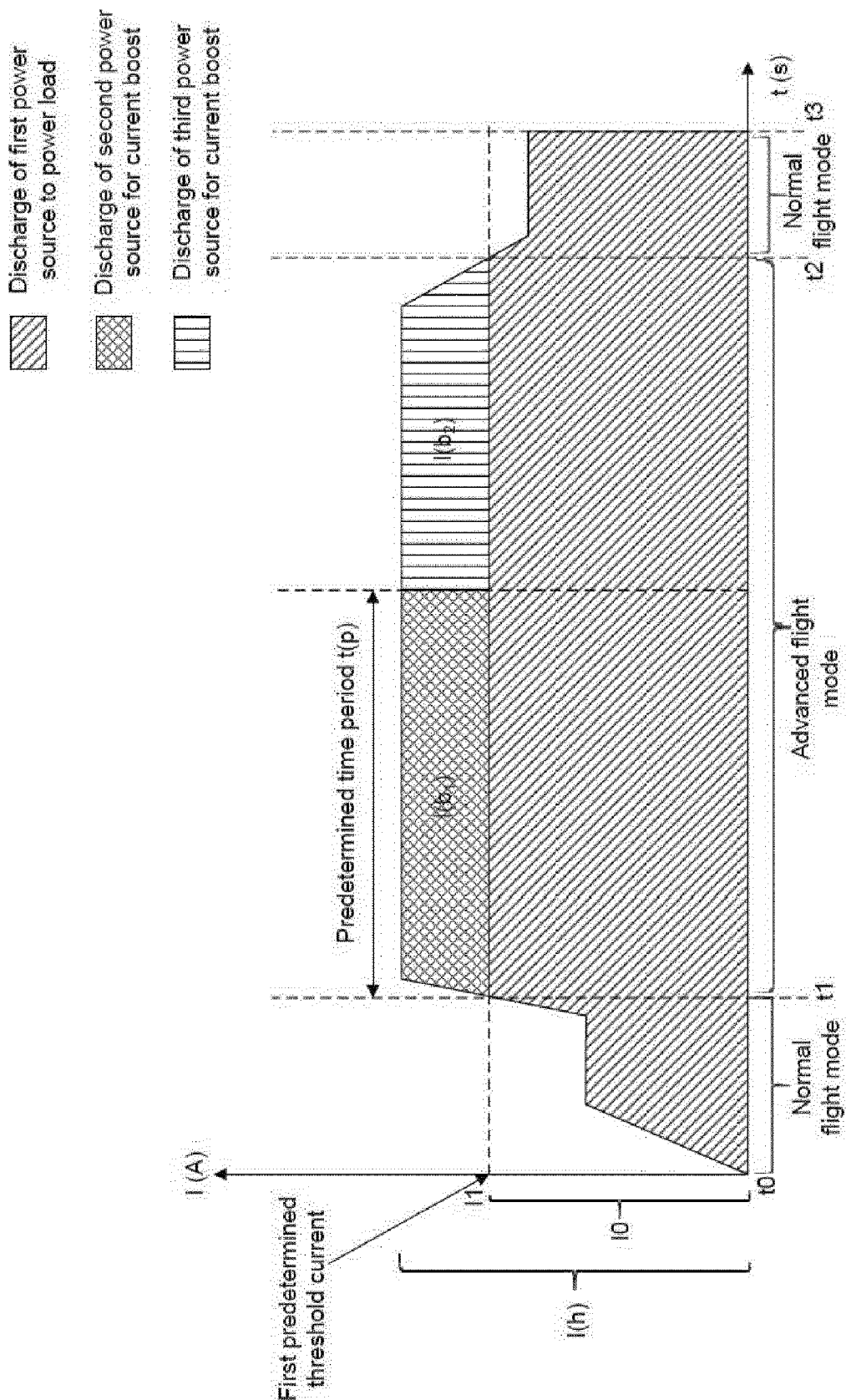
FIG. 15 illustrates a graph of the current I drawn by the load as a function of time t for the hybrid power system of FIG. 11, in accordance with those embodiments.

As shown in FIG. 15, when the UAV is in the advanced flight mode, the current drawn by the load exceeds the first predetermined threshold current during time t1-t2. The power controller may be configured to control discharging of the first power source and the second power source without permitting discharging of the third power source to power the load, when the current drawn by the load is greater than the first predetermined threshold current for less than or equal to a predetermined time period $t(p)$. The predetermined time period $t(p)$ may correspond to a maximum time period for which the second power source can discharge the first boost current $I(b_1)$, without the second power source experiencing over-depletion or damage due to excessive discharge. The predetermined time period $t(p)$ may be determined based on a power density (discharge rate performance) of the second power source. In some embodiments, the predetermined time period $t(p)$ may be at least 1 sec, 2 secs, 3 secs, 4 secs, 5 secs, 10 secs, 20 secs, 30 secs, or more than 30 secs.

The power controller may be further configured to turn off the second power source, and control discharging of the third power source to power the load, when the power drawn by the load is greater than the first predetermined threshold current starting from when the predetermined time period $t(p)$ ends. The third power source may substitute for the second power source to provide the current boost starting from when the time period ends.

When the current drawn by the load is greater than the first predetermined threshold current for less than or equal to the predetermined time period $t(p)$, the power controller may control the discharging of the first power source and the second power source, such that the first power source discharges the current I1 and the second power source discharges the first boost current $I(b_1)$ to power the load. The first boost current $I(b_1)$ may be given by the difference between the current $I(h)$ and the current I1 [i.e., $I(b_1)=I(h)-I1$]. During this time, any current up to the I1 limit may be provided by the first power source, and any current in excess of the I1 limit may be provided by the second power source. The sharing of the current load between the first power source and the second power source can protect the first power source from damage due to excessive current discharge. The second power source may have a power density such that the second power source is capable of discharging the first boost current $I(b_1)$ to supplement the current I1 discharged by the first power source. In some embodiments, the power density of the second power source may be higher than the power density of the first power source. In some embodiments, the energy density of the first power source may be higher than the energy density of the second power source.

Referring to FIG. 12, the discharge switch K3 is disposed between the second power source and the load. The power controller may be configured to turn on the discharge switch K3 at time t1 (in addition to the discharge switch K1 that is already turned on), when the UAV switches from the normal flight mode to the advanced flight mode. Specifically, the power controller may be configured to turn on the discharge switch K3 to allow the first boost current $I(b_1)$ to be discharged from the second power source to the load. The first boost current $I(b_1)$ serves to supplement the current I1 that is being discharged from the first power source to the load during the advanced flight mode for up to the end of the predetermined time period $t(p)$.

When the current drawn by the load is greater than the first predetermined threshold current for longer than the predetermined time period $t(p)$, the power controller may control discharging of the first power source and the third power source without permitting discharging of the second power source, starting from when the predetermined time period $t(p)$ ends. Specifically, the power controller may terminate the discharging of the second power source at the end of the predetermined time period $t(p)$, and control the discharging of the first power source and the third power source thereafter, such that the first power source discharges the current I1 and the third power source discharges the second boost current $I(b_2)$ to power the load. The second boost current $I(b_2)$ may be given by the difference between the current $I(h)$ and the current I1 [i.e., $I(b_2)=I(h)-I1$]. During this time, any current up to the I1 limit may be provided by the first power source, and any current in excess of the I1 limit may be provided by the third power source. The sharing of the current load between the first power source and the third power source can protect the first power source and the second power source from damage due to excessive current discharge. The third power source may have a power density such that the third power source is capable of discharging the second boost current $I(b_2)$ to supplement the current I1 discharged by the first power source. In some embodiments, the power density of the third power source may be higher than the power density of the second power source, and the power density of the second power source may be higher than the power density of the first power source. In some embodiments, the energy density of the first power source may be higher than the energy density of the second power source, and the energy density of the second power source may be higher than the energy density of the third power source.

Referring to FIG. 12, the discharge switch K5 is disposed between the third power source and the load. The power controller may be configured to turn off the discharge switch K3 and turn on the discharge switch K5 starting from when the predetermined time period t(p) ends (in addition to the discharge switch K1 that is already turned on). Specifically, the power controller may be configured to turn on the discharge switch K5 to allow the second boost current $I(b_2)$ to be discharged from the third power source to the load. The second boost current $I(b_2)$ serves to supplement the current I1 that is being discharged from the first power source to the load during the advanced flight mode. The power controller may be configured to turn off the discharge switch K5 at time t2 when the UAV switches from the advanced flight mode back to the normal flight mode. Turning off the discharge switch K5 terminates the discharge of the second boost current $I(b_2)$ from the third power source to the load. The discharge switch K1 continues to be turned on during the normal flight mode between time t2-t3, so that the current I0 can be discharged from the first power source to the load.

In some embodiments, the power controller may be configured to control the discharging of the second power source and the third power source based on a predetermined threshold power instead of a predetermined threshold current. For example, the power controller may be configured to control discharging of the second power source without permitting discharging of the third power source to power the load when a power drawn by the load is greater than a predetermined threshold power for a time period. The power controller may be further configured to control discharging of the third power source to power the load when the power drawn by the load is greater than the predetermined threshold power starting from when the time period ends. The time period may be less than or equal to a predetermined time period t(p). The predetermined time period may be determined based on a power density of the second power source. The third power source may be configured to supplement the second power source to power the load starting from when the time period ends. When the power drawn by the load is greater than the predetermined threshold power for the time period, the power controller may be configured to control the second power source to discharge a first boost current to power the load for the time period. When the power drawn by the load is greater than the predetermined threshold power starting from when the time period ends, the power controller may be configured to control the second power source to discharge the first boost current and the third power source to discharge a second boost current to power the load starting from when the time period ends. The second boost current may be configured to supplement the first boost current to power the load. In some instances, the power controller may be configured to control the discharging of the third power source to power the load when the second power source is depleted. In some cases, a power density of the third power source may be higher than a power density of the second power source, and an energy capacity density of the second power source may be higher than an energy capacity density of the third power source. In some embodiments, the hybrid power system may further comprise one or more current sensors to detect whether and/or when the current drawn by the load exceeds the predetermined threshold power. The sensors may be further configured to detect one or more discharging currents between the second power source, the third power source, and the load.

Next, various embodiments of the hybrid power system of FIGS. 9 and 10 will be described as follows.

In some embodiments, the first power source may be a fuel cell, the second power source may be a supercapacitor, and the third power source may be a solar cell. The fuel cell, the supercapacitor, and the solar cell are in electrical communication with the power controller, and are configured to power the load (e.g., propulsion units of the UAV). The power controller may be configured to control the discharging of the fuel cell, the supercapacitor, and the solar cell. The power controller may also be configured to control the charging of the supercapacitor by the fuel cell and/or the solar cell. In operation, the fuel cell may discharge at a substantially constant voltage (V1), constant current (I1), and constant power (W1). In some instances, the voltage V1 and current I1 may correspond to an output of the fuel cell providing a predetermined energy density of the fuel cell. The supercapacitor may be fully charged or partially charged before the UAV begins operation. The voltage of the supercapacitor may be V2. When V1≥V2, the fuel cell can charge the supercapacitor without power boosting. When V1<V2, the fuel cell can charge the supercapacitor with power boosting. The voltage of the solar cell may be V3. When V3≥V2, the solar cell can charge the supercapacitor without power boosting. When V3<V2, the solar cell can charge the supercapacitor with power boosting.

When the UAV is in the normal flight mode, the electrical current drawn by the load is I0, where I0≤I1. During the normal flight mode, the fuel cell may be used to power the UAV. Since I0≤I1, the electric power of the fuel cell alone is sufficient to power the UAV. When the UAV switches from the normal flight mode to the advanced flight mode, the load may draw a current I(h), where I(h)>I1. The power controller may then turn on a supercapacitor discharge switch (e.g., discharge switch K3), such that the supercapacitor provides an additional current boost I(b) to power the UAV, where I(b)=I(h)−I1. The supercapacitor has a high power density, and therefore can be used to provide an instantaneous high current to complete the maneuvers during the advanced flight mode.

When the maneuvers are completed, the UAV switches from the advanced flight mode back to the normal flight mode, and the power controller turns off the supercapacitor discharge switch. In some cases, the power controller may turn on a supercapacitor charge switch (e.g., charge switches K2 and/or K4), such that the fuel cell and/or the solar cell charge the supercapacitor. The power controller may turn off the supercapacitor charge switch when the supercapacitor is fully charged or reaches a predetermined charge state. In some cases, the electrical energy produced by the solar cell can be used to power the UAV during the normal flight mode and/or the advanced flight mode.

In some embodiments, the supercapacitor in the above example may be substituted by a lithium-ion battery. For example, the first power source may be a fuel cell, the second power source may be a lithium-ion battery, and the third power source may be a solar cell. The fuel cell, the lithium-ion battery, and the solar cell are in electrical communication with the power controller, and are configured to power the load (e.g., propulsion units of the UAV). The power controller may be configured to control the discharging of the fuel cell, the lithium-ion battery, and the solar cell. The power controller may also be configured to control the charging of the lithium-ion battery by the fuel cell and/or the solar cell. In operation, the fuel cell may discharge at a substantially constant voltage (V1), constant current (I1), and constant power (W1). The lithium-ion battery may be fully charged or partially charged before the UAV begins operation. The voltage of the lithium-ion battery may be V2. When V1≥V2, the fuel cell can charge the lithium-ion battery without power boosting. When V1<V2, the fuel cell can charge the lithium-ion battery with power boosting. The voltage of the solar cell may be V3. When V3≥V2, the solar cell can charge the lithium-ion battery without power boosting. When V3<V2, the solar cell can charge the lithium-ion battery without power boosting.

When the UAV is in the normal flight mode, the electrical current drawn by the load is I0, where I0≤I1. During the normal flight mode, the fuel cell may be used to power the UAV. Since I0≤I1, the electric power of the fuel cell alone is sufficient to power the UAV. When the UAV switches from the normal flight mode to the advanced flight mode, the load may draw a current I(h), where I(h)>I1. The power controller may then turn on a lithium-ion battery discharge switch (e.g., discharge switch K3), such that the lithium-ion battery provides an additional current boost I(b) to power the UAV, where I(b)=I(h)−I1.

When the maneuvers are completed, the UAV switches from the advanced flight mode back to the normal flight mode, and the power controller turns off the lithium-ion battery discharge switch. In some cases, the power controller may turn on a lithium-ion battery charge switch (e.g., charge switches K2 and/or K4), such that the fuel cell and/or the solar cell charge the lithium-ion battery. The power controller may turn off the lithium-ion battery charge switch when the lithium-ion battery is fully charged or reaches a predetermined charge state. In some cases, the electrical energy produced by the solar cell can be used to power the UAV during the normal flight mode and/or the advanced flight mode.

In some further embodiments, the first power source may be a lithium-ion battery, the second power source may be a supercapacitor, and the third power source may be a solar cell. The lithium-ion battery, the supercapacitor, and the solar cell are in electrical communication with the power controller, and are configured to power the load (e.g., propulsion units of the UAV). The power controller may be configured to control the discharging of the lithium-ion battery, the supercapacitor, and the solar cell. The power controller may also be configured to control the charging of the supercapacitor by the lithium-ion battery and/or the solar cell. In operation, the lithium-ion battery may discharge at a voltage (V1) and up to a current (I1). The lithium-ion battery and the supercapacitor may be fully charged or partially charged before the UAV begins operation. The voltage of the supercapacitor may be V2. When V1≥V2, the lithium-ion battery can charge the supercapacitor without power boosting. When V1<V2, the lithium-ion battery can charge the supercapacitor with power boosting. The voltage of the solar cell may be V3. When V3≥V2, the solar cell can charge the supercapacitor without power boosting. When V3<V2, the solar cell can charge the supercapacitor with power boosting.

When the UAV is in the normal flight mode, the electrical current drawn by the load is I0, where I0≤I1. During the normal flight mode, the lithium-ion battery may be used to power the UAV. Since I0≤I1, the electric power of the lithium-ion battery alone is sufficient to power the UAV. When the UAV switches from the normal flight mode to the advanced flight mode, the load may draw a current I(h), where I(h)>I1. The power controller may then turn on a supercapacitor discharge switch (e.g., discharge switch K3), such that the supercapacitor provides an additional current boost I(b) to power the UAV, where I(b)=I(h)−I1.

When the maneuvers are completed, the UAV switches from the advanced flight mode back to the normal flight mode, and the power controller turns off the supercapacitor discharge switch. In some cases, the power controller may turn on a supercapacitor charge switch (e.g., charge switches K2 and/or K4), such that the lithium-ion battery and/or the solar cell charge the supercapacitor. The power controller may turn off the supercapacitor charge switch when the supercapacitor is fully charged or reaches a predetermined charge state. In some cases, the electrical energy produced by the solar cell can be used to power the UAV during the normal flight mode and/or the advanced flight mode. In some instances, the power controller may turn on a lithium-ion battery charge switch (e.g., charge switch K4'), such that only the solar cell charges the lithium-ion battery.

Next, an embodiment of the hybrid power system of FIGS. 11 and 12 will be described as follows. The first power source may be a fuel cell, the second power source may be a lithium-ion battery, and the third power source may be a supercapacitor. The fuel cell, the lithium-ion battery, and the supercapacitor are in electrical communication with the power controller, and are configured to power the load (e.g., propulsion units of the UAV). The power controller may be configured to control the discharging of the fuel cell, the lithium-ion battery, and the supercapacitor. The power controller may also be configured to control the charging of the lithium-ion battery and/or the supercapacitor by the fuel cell. In operation, the fuel cell may discharge at a substantially constant voltage (V1), constant current (I1), and constant power (W1). The lithium-ion battery and/or the supercapacitor may be fully charged or partially charged before the UAV begins operation. The lithium-ion battery may be discharged up to a current I2. The current I2 may correspond to the maximum continuous discharge current or the maximum 30-sec discharge pulse current of the lithium-ion battery. The voltage of the lithium-ion battery may be V2. When V1≥V2, the fuel cell can charge the lithium-ion battery without power boosting. When V1<V2, the fuel cell can charge the lithium-ion battery with power boosting. The voltage of the supercapacitor may be V3. When V2≥V3, the lithium-ion battery can charge the supercapacitor without power boosting. When V2<V3, the lithium-ion battery can charge the supercapacitor with power boosting.

When the UAV is in the normal flight mode, the electrical current drawn by the load is I0, where I0≤I1. During the normal flight mode, the fuel cell may be used to power the UAV. Since I0≤I1, the electric power of the fuel cell alone is sufficient to power the UAV. When the UAV switches from the normal flight mode to the advanced flight mode, the load may draw a current I(h), where I(h)>I1. When I1<I(h)≤I2, the power controller may turn on the lithium-ion battery discharge switch (e.g., discharge switch K3), such that the lithium-ion battery provides a first current boost $I(b_1)$ to power the UAV. When $I(h)>I2$, the power controller may turn on the supercapacitor discharge switch (e.g., discharge switch K5), such that the supercapacitor provides a second current boost $I(b_2)$ to power the UAV. In some cases, when $I1<I(h)≤I2$ for less than or equal to a predetermined time period $t(p)$, the power controller may turn on the lithium-ion battery discharge switch (e.g., discharge switch K3), such that the lithium-ion battery provides the first current boost $I(b_1)$ to power the UAV. When $I(h)>I2$ for greater than the predetermined time period $t(p)$, the power controller may turn on the supercapacitor discharge switch (e.g., discharge switch K5), such that the supercapacitor provides the second current boost $I(b_2)$ to power the UAV.

When the maneuvers are completed, the UAV switches from the advanced flight mode back to the normal flight mode, and the power controller turns off the lithium-ion battery and/or the supercapacitor discharge switches. In some cases, the power controller may turn on a lithium-ion battery charge switch (e.g., charge switch K2), such that the fuel cell charges the lithium-ion battery. In some cases, the power controller may turn on a supercapacitor charge switch (e.g., charge switch K4), such that the lithium-ion battery charges the supercapacitor. In some cases, the power controller may turn on both the lithium-ion battery and the supercapacitor charge switches (e.g., charge switches K2 and K4), such that the fuel cell charges the lithium-ion battery and the supercapacitor. In some cases, the power controller may turn on a supercapacitor charge switch (e.g., charge switch K4'), such that the fuel cell charges the supercapacitor. The power controller may turn off the lithium-ion battery and/or the supercapacitor charge switches when the lithium-ion battery and/or the supercapacitor are fully charged or reach a predetermined charge state.

Figure 16:
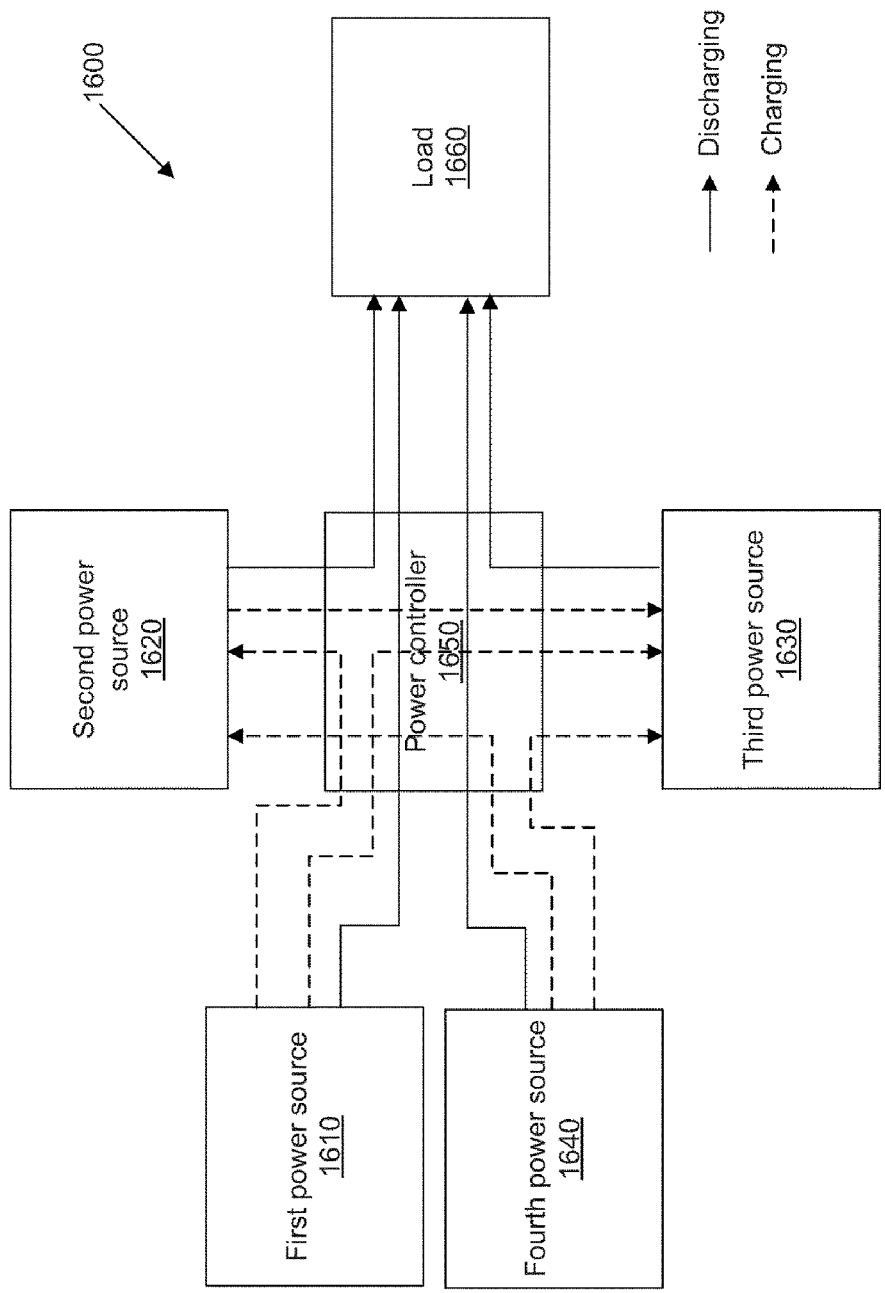
FIG. 16 illustrates a hybrid power system in accordance with some embodiments.

FIG. 16 illustrates a hybrid power system in accordance with some embodiments. The hybrid power system of FIG. 16 may be similar to the one in FIG. 11 except it further includes a fourth power source. The fourth power source may be located within the housing of the UAV. In some embodiments, the fourth power source may be located on an exterior portion of the housing of the UAV. The fourth power source may be in electrical communication with at least the power controller and the load. The fourth power source may also be in electrical communication with the first power source, the second power source, and/or the third power source.

The fourth power source may be configured to provide an additional boost current to supplement the discharge currents from the first/second/third power sources. In some embodiments, the fourth power source may be configured to charge the second/third power sources when the second/third power sources are in a partially depleted charge state or a completely depleted charge state. In some embodiments, the fourth power source may serve as a back-up energy source to the first/second/third power sources.

The fourth power source may be selected from the group of energy sources comprising of rechargeable batteries (e.g., lithium-ion batteries), supercapacitors, fuel cells, and solar energy generation systems. The first power source, the second power source, the third power source, and the fourth power source may comprise different types of energy sources. For example, in some embodiments, the first power source may be a fuel cell, the second power source may be a lithium-ion battery, the third power source may be a supercapacitor, and the fourth power source may be solar cell. In other embodiments, the first power source may be a solar cell, the second power source may be a lithium-ion battery, the third power source may be a supercapacitor, and the fourth power source may be fuel cell. In some alternative embodiments, the first power source, the second power source, and the third power source may comprise the same type of energy source.

The power controller may be configured to control discharging of the first/second/third/fourth power sources to power the load. The power controller may be further configured to control charging of the second/third power sources by at least one of the first/fourth power sources.

Figure 17:
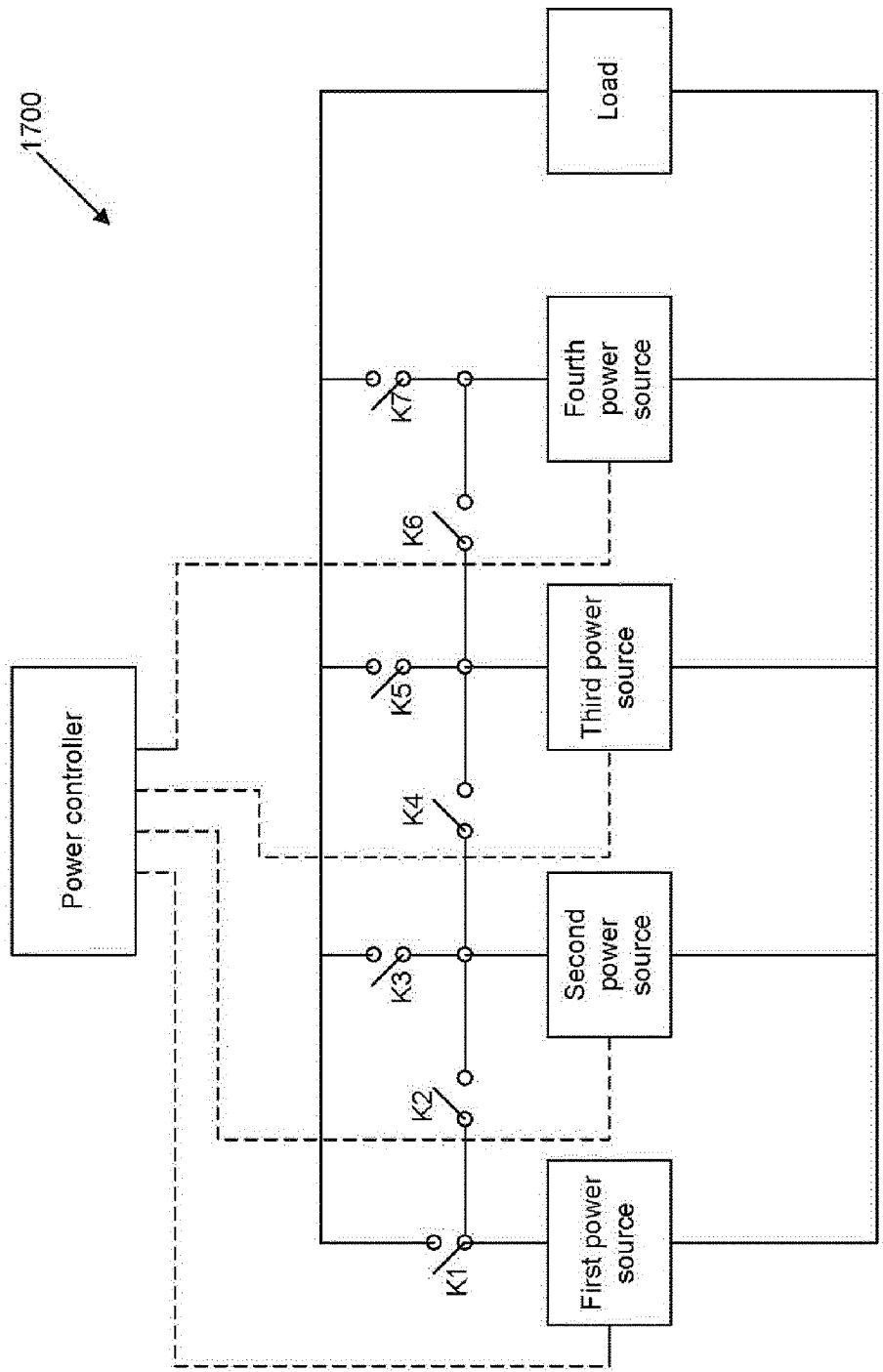
FIG. 17 illustrates a schematic circuit diagram of the hybrid power system of FIG. 16 in accordance with some embodiments.

FIG. 17 illustrates a schematic circuit diagram of the hybrid power system of FIG. 16 in accordance with some embodiments. The circuit diagram of FIG. 17 may be similar to the one in FIG. 10 except it further includes the fourth power source, a discharge switch K7, and a charge switch K6. The discharge switch K7 can be used to control discharging of the fourth power source to power the load. The charge switch K6 can be used to control charging of the third power source by the fourth power source. The discharge switch K7 and the charge switches K6 may include electronic switches such as power MOSFETs, solid state relays, power transistors, and/or insulated gate bipolar transistors (IGBTs). By turning on different combinations of the charge switches K2, K4, and K6, charging can take place between the different power sources.

Figure 18:
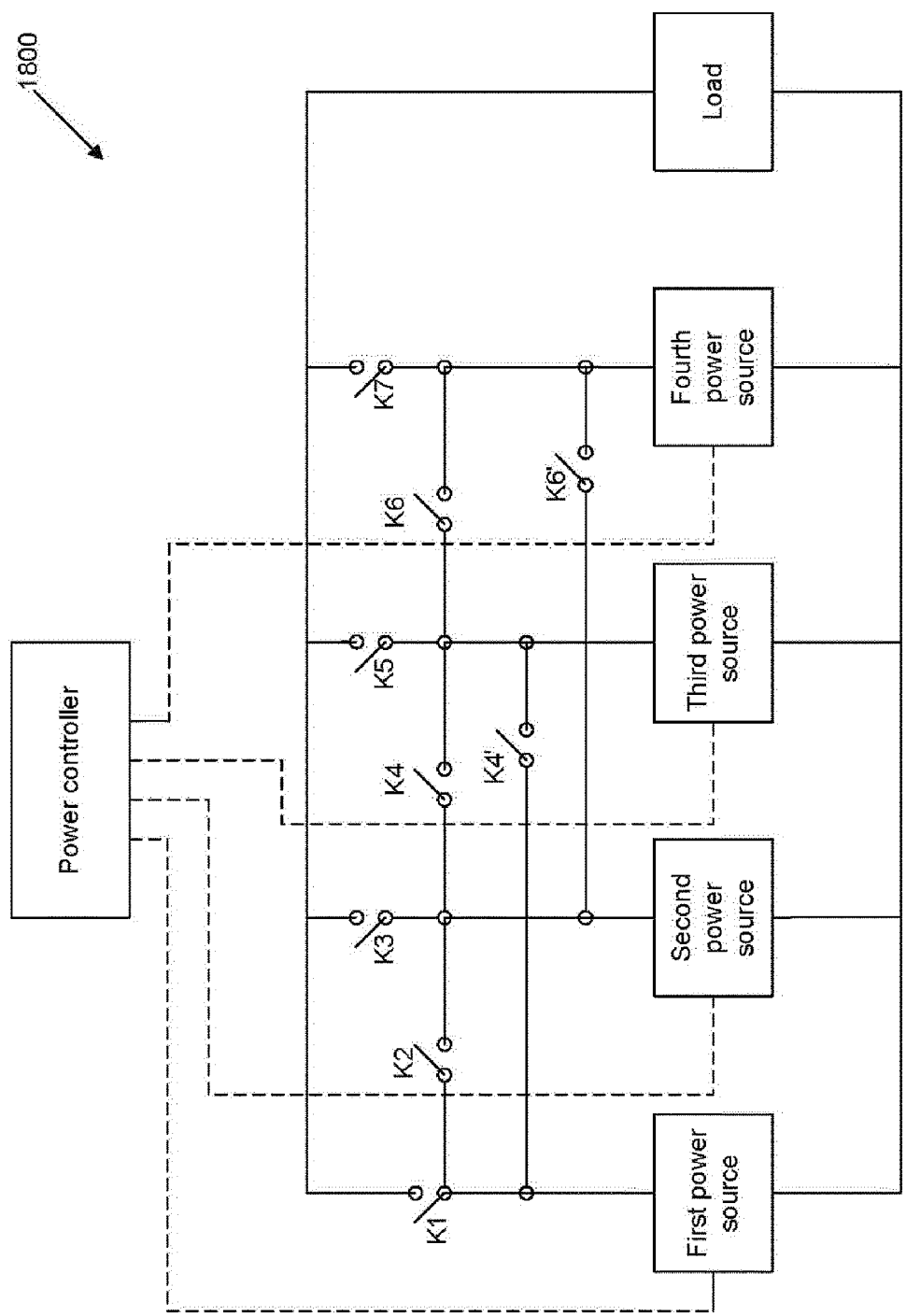
FIG. 18 illustrates a schematic circuit diagram of the hybrid power system of FIG. 16 in accordance with some other embodiments.

FIG. 18 illustrates a schematic circuit diagram of the hybrid power system of FIG. 16 in accordance with some other embodiments. The circuit diagram of FIG. 18 may be similar to the ones in FIGS. 10 and 17 except it further includes a charge switch K6'. The charge switch K6' can be used to control charging of the second power source by the fourth power source. The charge switch K6' may include electronic switches such as power MOSFETs, solid state relays, power transistors, and/or insulated gate bipolar transistors (IGBTs). By turning on different combinations of the charge switches K2, K4, K6, K4', and K6', charging can take place between the different power sources.

Next, an embodiment of the hybrid power system of FIG. 16 will be described as follows. The first power source may be a fuel cell, the second power source may be a lithium-ion battery, the third power source may be a supercapacitor, and the fourth power source may be a solar cell. The fuel cell, the lithium-ion battery, the supercapacitor, and the solar cell are in electrical communication with the power controller, and are configured to power the load (e.g., propulsion units of the UAV). The power controller may be configured to control the discharging of the fuel cell, the lithium-ion battery, the supercapacitor, and the solar cell. The power controller may also be configured to control the charging of the lithium-ion battery and/or the supercapacitor by the fuel cell and/or the solar cell. In operation, the fuel cell may discharge at a substantially constant voltage (V1), constant current (I1), and constant power (W1). The lithium-ion battery and/or the supercapacitor may be fully charged or partially charged before the UAV begins operation. The lithium-ion battery may be discharged up to a current I2. The current I2 may correspond to the maximum continuous discharge current or the maximum 30-sec discharge pulse current of the lithium-ion battery. The voltage of the lithium-ion battery may be V2. When V1≥V2, the fuel cell can charge the lithium-ion battery without power boosting. When V1<V2, the fuel cell can charge the lithium-ion battery with power boosting. The voltage of the supercapacitor may be V3. When V2≥V3, the lithium-ion battery can charge the supercapacitor without power boosting. When V2<V3, the lithium-ion battery can charge the supercapacitor with power boosting. The voltage of the solar cell may be V4. When V4≥V2, the solar cell can charge the lithium-ion battery without power boosting. When V4<V2, the solar cell can charge the lithium-ion battery with power boosting. When V4≥V3, the solar cell can charge the supercapacitor without power boosting. When V4<V3, the solar cell can charge the supercapacitor with power boosting.

When the UAV is in the normal flight mode, the electrical current drawn by the load is I0, where I0≤I1. During the normal flight mode, the fuel cell may be used to power the UAV. Since I0≤I1, the electric power of the fuel cell alone is sufficient to power the UAV. When the UAV switches from the normal flight mode to the advanced flight mode, the load may draw a current I(h), where I(h)>I1. When I1<I(h)≤I2, the power controller may turn on the lithium-ion battery discharge switch (e.g., discharge switch K3), such that the lithium-ion battery provides a first current boost $I(b_1)$ to power the UAV. When I(h)>I2, the power controller may turn on the supercapacitor discharge switch (e.g., discharge switch K5), such that the supercapacitor provides a second current boost $I(b_2)$ to power the UAV. In some cases, when I1<I(h)≤I2 for less than or equal to a predetermined time period t(p), the power controller may turn on the lithium-ion battery discharge switch (e.g., discharge switch K3), such that the lithium-ion battery provides the first current boost $I(b_1)$ to power the UAV. When I(h)>I2 for greater than the predetermined time period t(p), the power controller may turn on the supercapacitor discharge switch (e.g., discharge switch K5), such that the supercapacitor provides the second current boost $I(b_2)$ to power the UAV.

When the maneuvers are completed, the UAV switches from the advanced flight mode back to the normal flight mode, and the power controller turns off the lithium-ion battery and/or the supercapacitor discharge switches. In some cases, the power controller may turn on a lithium-ion battery charge switch (e.g., charge switch K2), such that the fuel cell charges the lithium-ion battery. In some cases, the power controller may turn on a supercapacitor charge switch (e.g., charge switch K4), such that the lithium-ion battery charges the supercapacitor. In some cases, the power controller may turn on the lithium-ion battery and the supercapacitor charge switches (e.g., charge switches K2 and K4), such that the fuel cell charges the lithium-ion battery and the supercapacitor. In some cases, the power controller may turn on a supercapacitor charge switch (e.g., charge switch K6), such that the solar cell charges the supercapacitor. In some cases, the power controller may turn on a supercapacitor charge switch (e.g., charge switch K4'), such that the fuel cell charges the supercapacitor. In some cases, the power controller may turn on a lithium-ion battery charge switch (e.g., charge switch K6'), such that the solar cell charges the lithium-ion battery. In some cases, the power controller may turn on the lithium-ion battery and the supercapacitor charge switches (e.g., charge switches K2, K4, and K6), such that the fuel cell and the solar cell charge the lithium-ion battery and the supercapacitor. The power controller may turn off the lithium-ion battery and/or the supercapacitor charge switches when the lithium-ion battery and/or the supercapacitor are fully charged or reach a predetermined charge state.

According to the embodiments described herein, an exemplary hybrid power system may comprise a plurality of power sources. The power sources may include energy sources such as rechargeable batteries (such as lithium-ion batteries), supercapacitors, fuel cells, solar cells, and/or any other type of energy source. By leveraging the characteristics of fast load response, high power density, and high discharge current capability of the different types of energy sources, the maneuverability of the UAV can be improved and its flight duration can be increased. In addition, the reliability and service life of the various power sources can be improved by sharing/modulating the current load between different power sources.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a remotely controlled vehicle described elsewhere herein. In some embodiments, the movable object can be mounted on a living subject, such as a human or an animal.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

For example, the propulsion system can include one or more rotors. A rotor can include one or more blades (e.g., one, two, three, four, or more blades) affixed to a central shaft. The blades can be disposed symmetrically or asymmetrically about the central shaft. The blades can be turned by rotation of the central shaft, which can be driven by a suitable motor or engine. The blades can be configured to spin in a clockwise rotation and/or a counterclockwise rotation. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the movable object. Vertically oriented rotors may spin and provide thrust to the movable object. Rotors oriented an intermediate angle between the horizontal and vertical positions may spin and provide both lift and thrust to the movable object. One or more rotors may be used to provide a torque counteracting a torque produced by the spinning of another rotor.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. Optionally, a ratio of a movable object weight to a load weight may be greater than, less than, or equal to about 1:1. When desired, the ratio of a movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 19:
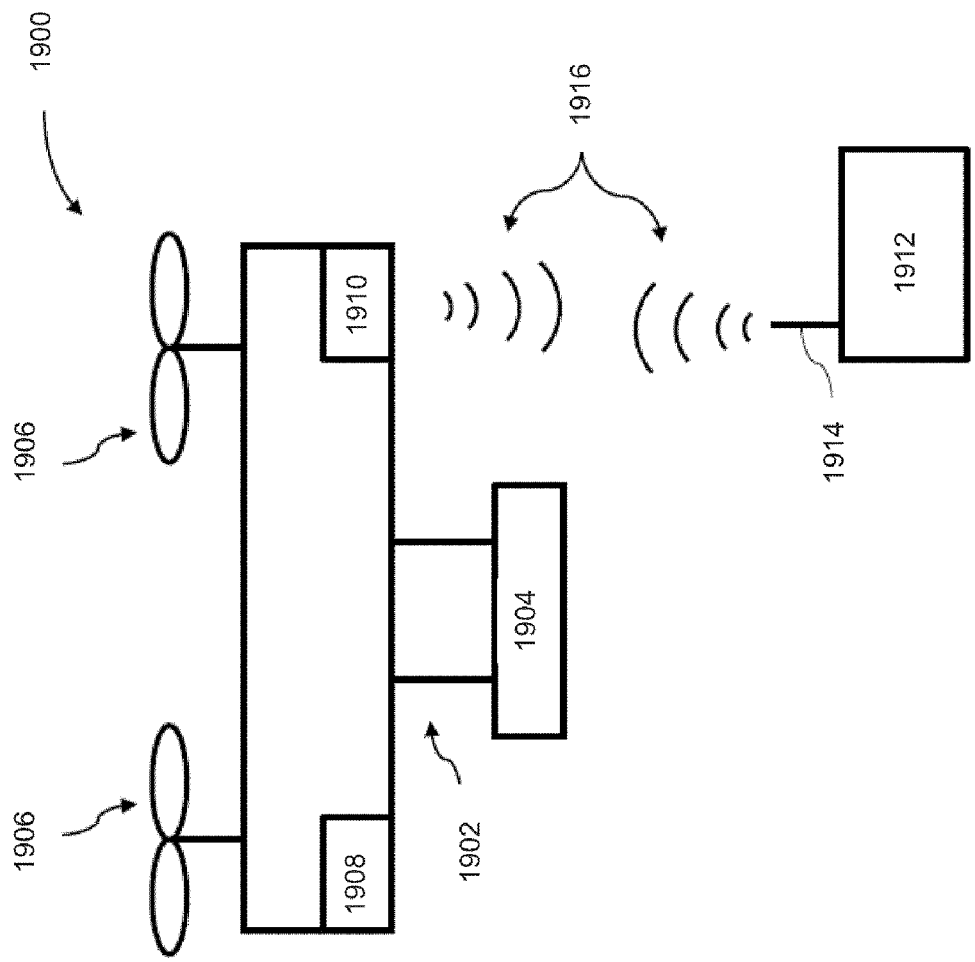
FIG. 19 illustrates a movable object in accordance with some embodiments.

FIG. 19 illustrates a movable object 1900 including a carrier 1902 and a payload 1904, in accordance with embodiments. Although the movable object 1900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV).

In some embodiments, the movable object 1900 may be a UAV. The UAV can include a propulsion system any number of rotors (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 7 m, from 70 cm to 2 m, or from 5 cm to 5 m. Any description herein of a UAV may apply to a movable object, such as a movable object of a different type, and vice versa.

In some instances, the payload 1904 may be provided on the movable object 1900 without requiring the carrier 1902. The movable object 1900 may include propulsion mechanisms 1906, a sensing system 1908, and a communication system 1910. The propulsion mechanisms 1906 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 1906 can enable the movable object 1900 to take off vertically from a surface or land vertically on a surface without requiring any horizontal movement of the movable object 1900 (e.g., without traveling down a runway). Optionally, the propulsion mechanisms 1906 can be operable to permit the movable object 1900 to hover in the air at a specified position and/or orientation.

For example, the movable object 1900 can have multiple horizontally oriented rotors that can provide lift and/or thrust to the movable object. The multiple horizontally oriented rotors can be actuated to provide vertical takeoff, vertical landing, and hovering capabilities to the movable object 3000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1900 (e.g., with respect to up to three degrees of translation and up to three degrees of rotation).

The sensing system 1908 can include one or more sensors that may sense the spatial disposition, velocity, and/or acceleration of the movable object 1900 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1908 can be used to control the spatial disposition, velocity, and/or orientation of the movable object 1900 (e.g., using a suitable processing unit and/or control module, as described below). Alternatively, the sensing system 1908 can be used to provide data regarding the environment surrounding the movable object, such as weather conditions, proximity to potential obstacles, location of geographical features, location of manmade structures, and the like.

The communication system 1910 enables communication with terminal 1912 having a communication system 1914 via wireless signals 1916. In some embodiments, the terminal may include an image analyzer, a motion sensing module, and/or a motion controller as described elsewhere herein. The communication systems 1910, 1914 may include any number of transmitters, receivers, and/or transceivers suitable for wireless communication. The communication may be one-way communication, such that data can be transmitted in only one direction. For example, one-way communication may involve only the movable object 1900 transmitting data to the terminal 1912, or vice-versa. The data may be transmitted from one or more transmitters of the communication system 1910 to one or more receivers of the communication system 1912, or vice-versa. Alternatively, the communication may be two-way communication, such that data can be transmitted in both directions between the movable object 1900 and the terminal 1912. The two-way communication can involve transmitting data from one or more transmitters of the communication system 1910 to one or more receivers of the communication system 1914, and vice-versa.

In some embodiments, the terminal 1912 can provide control data to one or more of the movable object 1900, carrier 1902, and payload 1904 and receive information from one or more of the movable object 1900, carrier 1902, and payload 1904 (e.g., position and/or motion information of the movable object, carrier or payload; data sensed by the payload such as image data captured by a payload camera). In some embodiments, the movable object 1900 can be configured to communicate with another remote device in addition to the terminal 1912, or instead of the terminal 1912. The terminal 1912 may also be configured to communicate with another remote device as well as the movable object 1900. For example, the movable object 1900 and/or terminal 1912 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1900, receive data from the movable object 1900, transmit data to the terminal 1912, and/or receive data from the terminal 1912. Optionally, the remote device can be connected to the Internet or other telecommunications network, such that data received from the movable object 1900 and/or terminal 1912 can be uploaded to a website or server.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A hybrid power system, comprising:
   a power controller adapted to be in communication with a first power source, a second power source, and a load, wherein the power controller is configured to:
   control discharging of the first power source without permitting discharging of the second power source to power the load when a power drawn by the load is greater than a predetermined threshold power for a time period; and
   control discharging of the second power source to power the load when the power drawn by the load is greater than the predetermined threshold power starting from when the time period ends.

2. The hybrid power system of claim 1, wherein the first power source is a fuel cell and the second power source is a super capacitor.

3. The hybrid power system of claim 1, wherein the first power source is a fuel cell and the second power source is a lithium-ion battery.

4. The hybrid power system of claim 1, wherein the first power source is a lithium-ion battery and the second power source is a super capacitor.

5. The hybrid power system of claim 1, wherein:
   the time period is less than or equal to a predetermined time period; and
   the predetermined time period is determined based on a power density of the second power source.

6. The hybrid power system of claim 5, wherein the second power source is configured to supplement the first power source to power the load starting from when the time period ends.

7. The hybrid power system of claim 1, wherein:
   when the power drawn by the load is greater than the predetermined threshold power for the time period, the power controller is configured to control the first power source to discharge a current to power the load for the time period.

8. The hybrid power system of claim 1, wherein:
when the power drawn by the load is greater than the predetermined threshold power starting from when the time period ends, the power controller is configured to control the first power source to discharge a first current and the second power source to discharge a second current to power the load starting from when the time period ends.

9. The hybrid power system of claim 8, wherein the second current is configured to supplement the first current to power the load.

10. The hybrid power system of claim 1, wherein the power controller is configured to control the discharging of the second power source to power the load when the first power source is depleted.

11. The hybrid power system of claim 1, wherein a power density of the second power source is higher than a power density of the first power source.

12. The hybrid power system of claim 1, wherein an energy capacity density of the first power source is higher than an energy capacity density of the second power source.

13. The hybrid power system of claim 1, further comprising:
one or more current sensors to detect whether and/or when the current drawn by the load exceeds the predetermined threshold power.

14. The hybrid power system of claim 13, wherein the sensors are further configured to detect one or more discharging currents between the first power source, the second power source, and the load.

15. An unmanned aerial vehicle (UAV), comprising:
a load comprising at least one propulsion unit; and
a power controller adapted to be in communication with a first power source, a second power source, and the load, wherein the power controller is configured to:
control discharging of the first power source without permitting discharging of the second power source to power the load when a power drawn by the load is greater than a predetermined threshold power for a time period; and
control discharging of the second power source to power the load when the power drawn by the load is greater than the predetermined threshold power starting from when the time period ends.

16. The UAV according to claim 15, wherein the first power source is a fuel cell and the second power source is a super capacitor.

17. The UAV according to claim 15, wherein the first power source is a fuel cell and the second power source is a lithium-ion battery.

18. A method for controlling power delivery, comprising:
controlling, with aid of one or more processors, discharging of a first power source without permitting discharging of a second power source to power the load when a power drawn by the load is greater than a predetermined threshold power for a time period; and
controlling, with the aid of the one or more processors, discharging of the second power source to power the load when the power drawn by the load is greater than the predetermined threshold power starting from when the time period ends.

19. The method according to claim 18, further comprising:
in response to the power drawn by the load being greater than the predetermined threshold power for the time period, controlling the first power source to discharge a current to power the load for the time period.

20. The method according to claim 18, further comprising:
in response to the power drawn by the load being greater than the predetermined threshold power starting from when the time period ends, controlling the first power source to discharge a first current and the second power source to discharge a second current to power the load starting from when the time period ends.

* * * * *